US012585363B2

(12) United States Patent

Moriyama

(10) Patent No.: US 12,585,363 B2
(45) Date of Patent: Mar. 24, 2026

(54) INFORMATION INPUT DEVICE, SENSITIVITY DETERMINATION METHOD, AND STORAGE MEDIUM

(71) Applicant: CASIO COMPUTER CO., LTD., Tokyo (JP)

(72) Inventor: Teppei Moriyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/520,877

(22) Filed: Nov. 28, 2023

(65) Prior Publication Data

US 2024/0211079 A1 Jun. 27, 2024

(30) Foreign Application Priority Data

Dec. 22, 2022 (JP) ................................. 2022-205152

(51) Int. Cl.
  G06F 3/044 (2006.01)
  G06F 3/041 (2006.01)
(52) U.S. Cl.
  CPC ............ G06F 3/044 (2013.01); G06F 3/0416 (2013.01)
(58) Field of Classification Search
  CPC ...... G06F 3/044; G06F 3/0443; G06F 3/0445; G06F 3/0446
  See application file for complete search history.

(56) References Cited

U.S. PATENT DOCUMENTS

| | | | | |
|---|---|---|---|---|
| 10,963,095 | B1 * | 3/2021 | Dedhia | .............. G06F 3/04166 |
| 2014/0111430 | A1 * | 4/2014 | Shima | .................... G06F 3/0443 |
| | | | | 345/157 |
| 2014/0267108 | A1 * | 9/2014 | Chung | .............. G06F 3/041661 |
| | | | | 345/173 |
| 2017/0017322 | A1 | 1/2017 | Shima | |
| 2024/0028121 | A1 * | 1/2024 | Reddy | .................. G06F 1/1643 |

FOREIGN PATENT DOCUMENTS

| | | | | | |
|---|---|---|---|---|---|
| CN | 103135872 | A | * | 6/2013 | ............. G06F 3/044 |
| JP | 2007027034 | A | | 2/2007 | |
| JP | 2020113305 | A | | 7/2020 | |
| WO | 2012169106 | A1 | | 12/2012 | |

* cited by examiner

*Primary Examiner* — Yuzhen Shen
(74) *Attorney, Agent, or Firm* — Holtz, Holtz & Volek PC

(57) ABSTRACT

An information input device includes a touch panel and a processor. The processor receives a touch input to the touch panel with each of multiple media. The processor detects which of multiple thresholds is exceeded by a capacitance change of the touch panel in response to a touch input to the touch panel. The processor determines thresholds of capacitance change for respective media based on a detected result. The respective media are the multiple media. The thresholds of capacitance change are each used in judgement on whether or not a touch input to the touch panel with the each of the multiple media is made.

12 Claims, 14 Drawing Sheets

INFORMATION INPUT DEVICE, SENSITIVITY DETERMINATION METHOD, AND STORAGE MEDIUM

REFERENCE TO RELATED APPLICATIONS

The entire disclosure of Japanese Patent Application No. 2022-205152 filed on Dec. 22, 2022 is incorporated herein by reference in its entirety.

TECHNICAL FIELD

This disclosure relates to an information input device, a sensitivity determination method, and a storage medium.

DESCRIPTION OF RELATED ART

A handheld terminal is known as a portable terminal used in stores, warehouses, etc., that performs business processes such as reading barcodes attached to products. Some handheld terminals are known to have a touch panel. Conventionally, a resistive film touch panel (a pressure sensitive touch panel) has been mainly used in a handheld terminal. The resistive film touch panel includes two resistive films facing each other and forming transparent electrodes. While a voltage is applied to one of the resistive films, a voltage generated in the other resistive film in response to the pressing operation is measured such that the position of the pressing operation is detected.

The resistive film touch panel has been the mainstream because, in addition to the high durability (high resistance to cracking) of the screen, business processes require operation with a variety of medium such as a finger with glove (a glove) or a stylus pen, as well as with a bare hand (a finger). When the screen is pressed with a medium, the resistive film touch panel can detect an input regardless of what the medium is.

In recent years, more and more handheld terminals have adopted electrostatic capacitive touch panels, similar to smartphones. In the electrostatic capacitive touch panel, changes in electrostatic capacitance between an operation input medium such as a finger and a conductive film are obtained, and the operated position is detected. Even when a resistive film touch panel is replaced by the electrostatic capacitive touch panel, the handheld terminal still needs to be operable with a finger, a glove, or a stylus pen. Many smartphones, however, cannot be operated with a glove or a stylus pen. To meet the above need, handheld terminals at present are generally designed to be operated in multiple operating modes having sensitivity suitable for a finger (finger mode), a glove (glove mode), and a stylus pen.

For example, sensitivity in the glove mode is set higher than that in the finger mode, so that even a gloved finger can be detected. However, due to individual differences in finger shape and thickness and different types of gloves to be used, even when several modes are prepared in advance, the optimal settings are different from user to user. Therefore, it is difficult to set the optimal settings for each user.

Therefore, a known input device has an electrostatic capacitive touch panel, measures electrostatic capacitance in response to an input by a user with a bare finger or a glove, and sets one of four sensitivity modes based on the measurement results and three thresholds as the sensitivity mode of the touch panel (see WO2012/169106A1).

SUMMARY OF THE INVENTION

The information input device of the present disclosure includes a touch panel and a processor. The processor receives a touch input to the touch panel with each of multiple media. The processor detects which of multiple thresholds is exceeded by a capacitance change of the touch panel in response to a touch input to the touch panel. The processor determines thresholds of capacitance change for respective media based on a detected result. The respective media are the multiple media. The thresholds of capacitance change is each used in judgement on whether or not a touch input to the touch panel with the each of the multiple media is made.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, the first to fifth embodiments of the present disclosure will be described in detail one after the other with reference to the attached drawings. Various technically preferred limitations are included in the embodiments described below in order to implement the present disclosure, but the scope of the present disclosure is not limited to the following embodiments and illustrated examples.

First Embodiment

Figure 1:
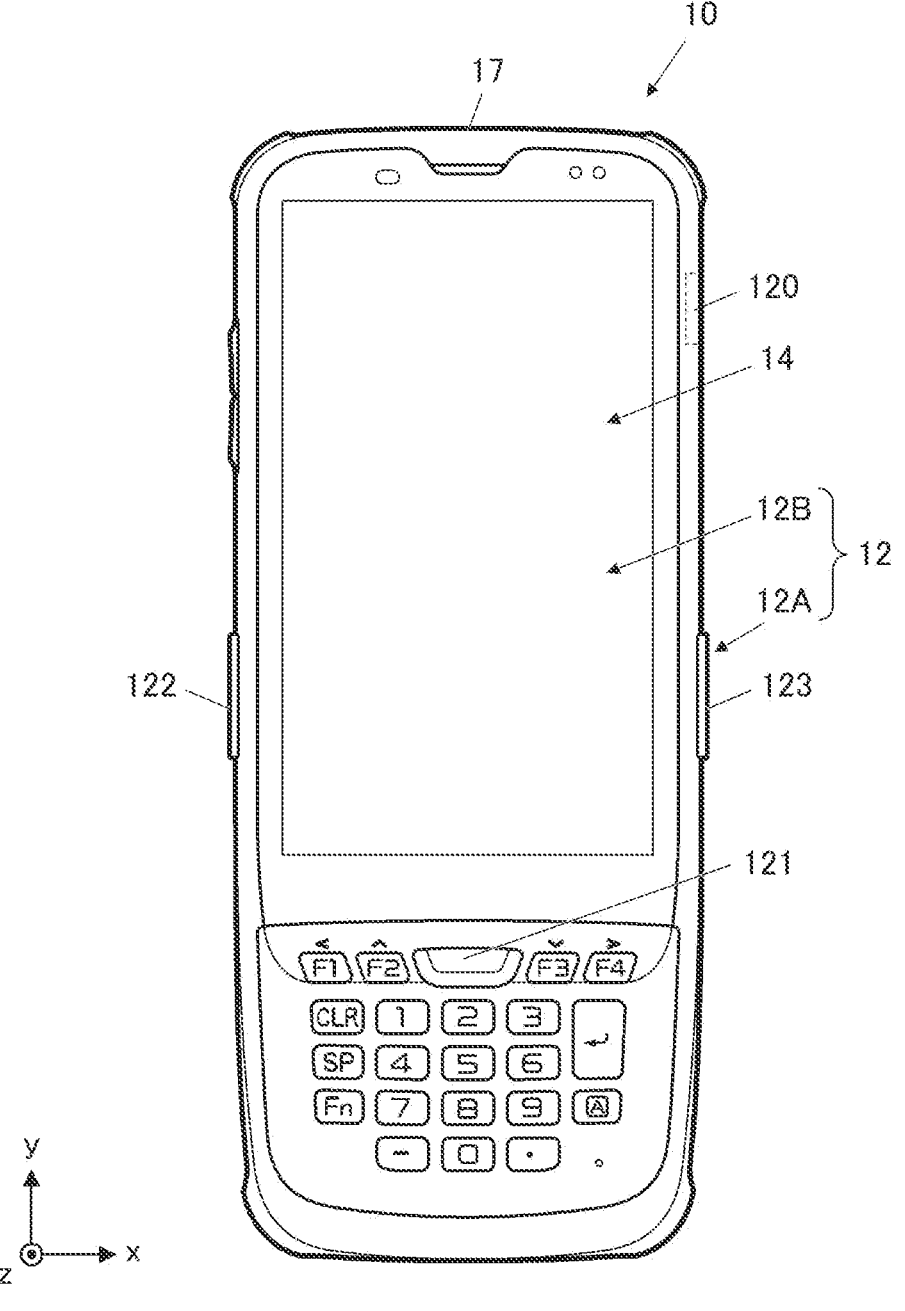
FIG. 1 is a front view of a handheld terminal of first embodiment of the present disclosure.
Figure 2:
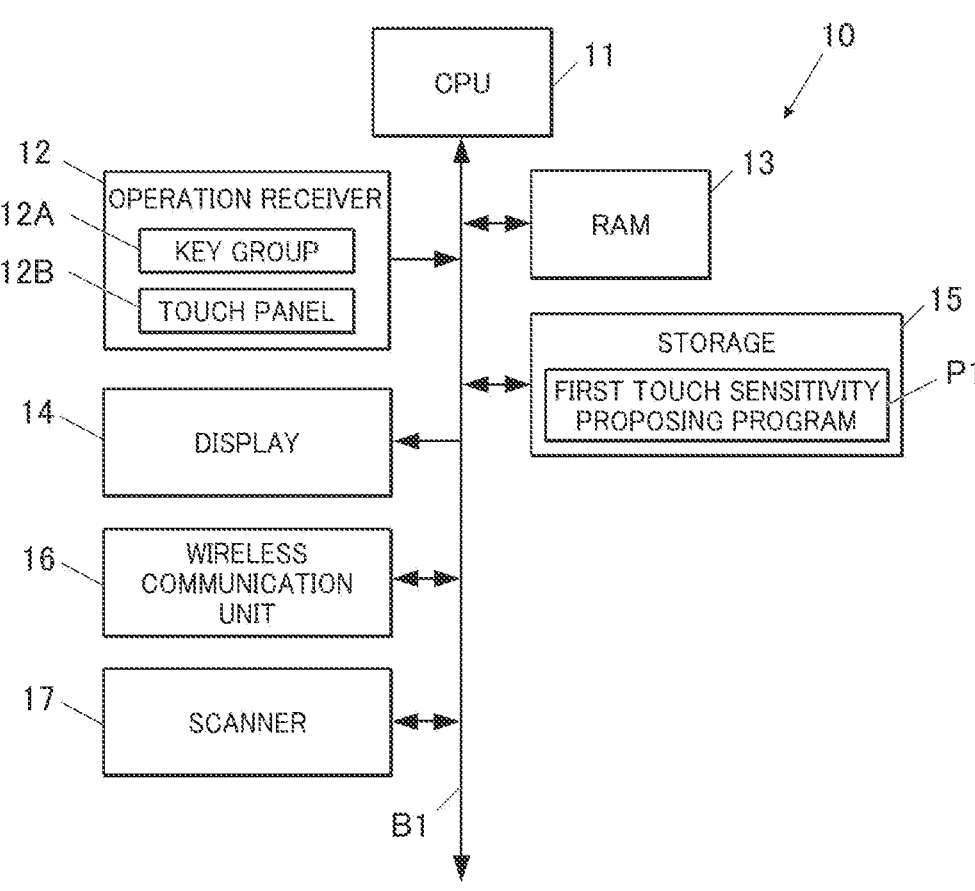
FIG. 2 is a block diagram illustrating a functional structure of the handheld terminal.

With reference to FIG. 1 to FIG. 5B, the first embodiment of the present disclosure will now be described. First, with reference to FIG. 1 and FIG. 2, the configuration of the device of the present embodiment will be described. FIG. 1 is a front view of the handheld terminal 10 of the present embodiment. FIG. 2 is a block diagram illustrating the functional structure of the handheld terminal 10.

As illustrated in FIG. 1, the handheld terminal 10 of the present embodiment is a portable terminal used by a clerk(s) in a shop, such as a supermarket and a mass merchandiser, and a worker(s) in a warehouse, etc., as a user(s). Goods stored in the shop or the warehouse are each marked with a symbol such as a bar code, two-dimensional code, or the like, which contains encoded product information such as identification information of the goods. The user performs business processes such as scanning the symbol attached to the goods and receiving operational inputs of various kinds of information related to the business with the handheld terminal 10.

As illustrated in FIG. 1, (+)x, (+)y, and (+)z directions in a three-dimensional space are defined with reference to the handheld terminal 10. For example, the front surface of the handheld terminal 10 is parallel to an xy plane.

The handheld terminal 10 includes an operation receiver 12, a display 14, and a scanner 17. The operation receiver 12 is an operation input receiver that receives an operation input by the user. The operation receiver 12 has a key group 12A and a touch panel 12B. The key group 12A includes a plurality of keys as operation elements that receive a pressing input by the user. The key group 12A includes a plurality of keys as operating elements that receive a pressing input by the user. The key group 12A includes a power key 120, character input keys that receive numeric/character inputs etc., various keys such as a CLR key for cancellation input, a decision key for decision input, a numeric/character switching key, and a function key, and trigger keys 121, 122, 123. The character input keys, the CLR key, the decision key, the switching key, and the function keys of the key group 12A are arranged on the lower (−y direction) side of the front surface (xy-plane) of a housing of the handheld terminal 10.

The power key 120 receives an input to turn on the handheld terminal 10 by the user. The trigger keys 121, 122 and 123 receive inputs to start the scanning of a symbol by the scanner 17.

The touch panel 12B is an operating element integrally formed on the display panel of the display 14 and receives a touch input with a finger of the user or the like. In the present embodiment, the touch panel 12B is an electrostatic capacitive touch panel.

The user mainly uses the handheld terminal 10 by an operational input with a bare finger. However, the user may use the handheld terminal 10 in areas with low temperatures, in rooms with low room temperatures in stores or warehouses, in environments where gloves must be worn for hygienic reasons, and so on. Therefore, a bare finger and a glove worn on the hand are described as the media (operation input media) with which the user performs a touch input to the handheld terminal 10.

The display 14 includes a display panel of an LCD (Liquid Crystal Display) or an EL (Electro-Luminescent) display, on which various kinds of displaying information is displayed. The display panel of the display 14 is arranged on the front surface (xy-plane) of the housing of the handheld terminal 10.

The scanner 17 is an image scanner that captures an image for reading a symbol and is arranged at the top (+y direction) side of the housing of the handheld terminal 10. The scanner 17 is a digital camera unit having a CCD (Charge Coupled Device), a CMOS (Complementary Metal Oxide Semiconductor), an imaging element such as an image sensor, an optical system, etc., and generates and outputs image data of the captured object (symbol). Alternatively, the scanner 17 may be a laser scanner that scans a barcode as a symbol.

The handheld terminal 10 is not limited to a configuration in which the display 14 on which the touch panel 12B is arranged and some of the key group 12A (character input keys, CLR key, decision key, switching key, function key, etc.) are arranged on the front surface of the housing. For example, a handheld terminal in which a display and a touch panel arranged on a display panel of the display are arranged on the entire front surface of the housing may be used in the present embodiment.

Then, the internal functional configuration (circuit configuration) of the handheld terminal 10 will be described with reference to FIG. 2. The handheld terminal 10 includes at least one CPU (Central Processing Unit) 11, the operation receiver 12, a RAM (Random Access Memory) 13, a display 14, a storage 15, a wireless communication unit 16, and the scanner 17. Each part of the handheld terminal 10 is connected via a bus B1.

The CPU 11 controls each part of the handheld terminal 10. The CPU 11 reads a designated program out of various programs stored in the storage 15, loads the program into the RAM 13, and executes various processes in cooperation with the loaded program.

The operation receiver 12 includes the key group 12A and the touch panel 12B as described above. The operation receiver 12 receives an operation input by the user such as a key input to the key group 12A and a touch input to the touch panel 12B, and outputs information on the operation to the CPU 11.

The value of change in the electrostatic capacitance (hereinafter referred to as "capacitance change") between the medium used for a touch input and a conductive film of the electrostatic capacitive touch panel 12B depends on the medium. Specifically, the capacitance change depends on the type of the medium (finger, glove, etc.), depends on the user, and depends on the medium even when the type and the user are the same. Therefore, a threshold of capacitance change of the touch panel 12B is preferably set for detection of each medium depending on the sensitivity of the medium. This threshold is used to judge whether or not a touch input is made. For example, a touch input is judged to be made when the capacitance change is equal to or greater than the threshold, and a touch input is judged not to be made when the capacitance change is lower than the threshold.

The RAM 13 is a volatile semiconductor memory that can read and write information, provides the CPU 11 with a workspace for work, and temporarily stores data and programs.

The display 14 displays types of displaying information on the display panel according to various types of displaying information that is input from the CPU 11 and the like.

The storage 15 is a storage section including a flash memory and the like and capable of reading and writing information and stores various data and various programs. In particular, the storage 15 stores the first touch sensitivity proposing program P1 for executing the first touch sensitivity proposing process described later.

The wireless communication unit 16 is a wireless communication unit for WLAN (Wireless Local Area Network) and/or WAN (Wide Area Network) and has an antenna for WLAN and/or WAN, an oscillator, a modulator, an amplifier, a signal processor, and the like. The wireless communication unit 16 performs wireless communication with an access point or a base station on a communication network (not shown) according to the instructions from the CPU 11. The CPU 11 communicates with external devices on the communication network via the wireless communication of the wireless communication unit 16.

The scanner 17 captures the symbol as an object and generates image data as scan data according to the instructions from the CPU 11, and outputs the image data to the CPU 11 and the like.

The handheld terminal 10 may further have an imaging unit other than the scanner 17, a communication unit of other communication methods such as NFC (Near Field Communication), a sound output unit having a speaker, and a light output unit such as an LED (Light Emitting Diode).

Figure 3:
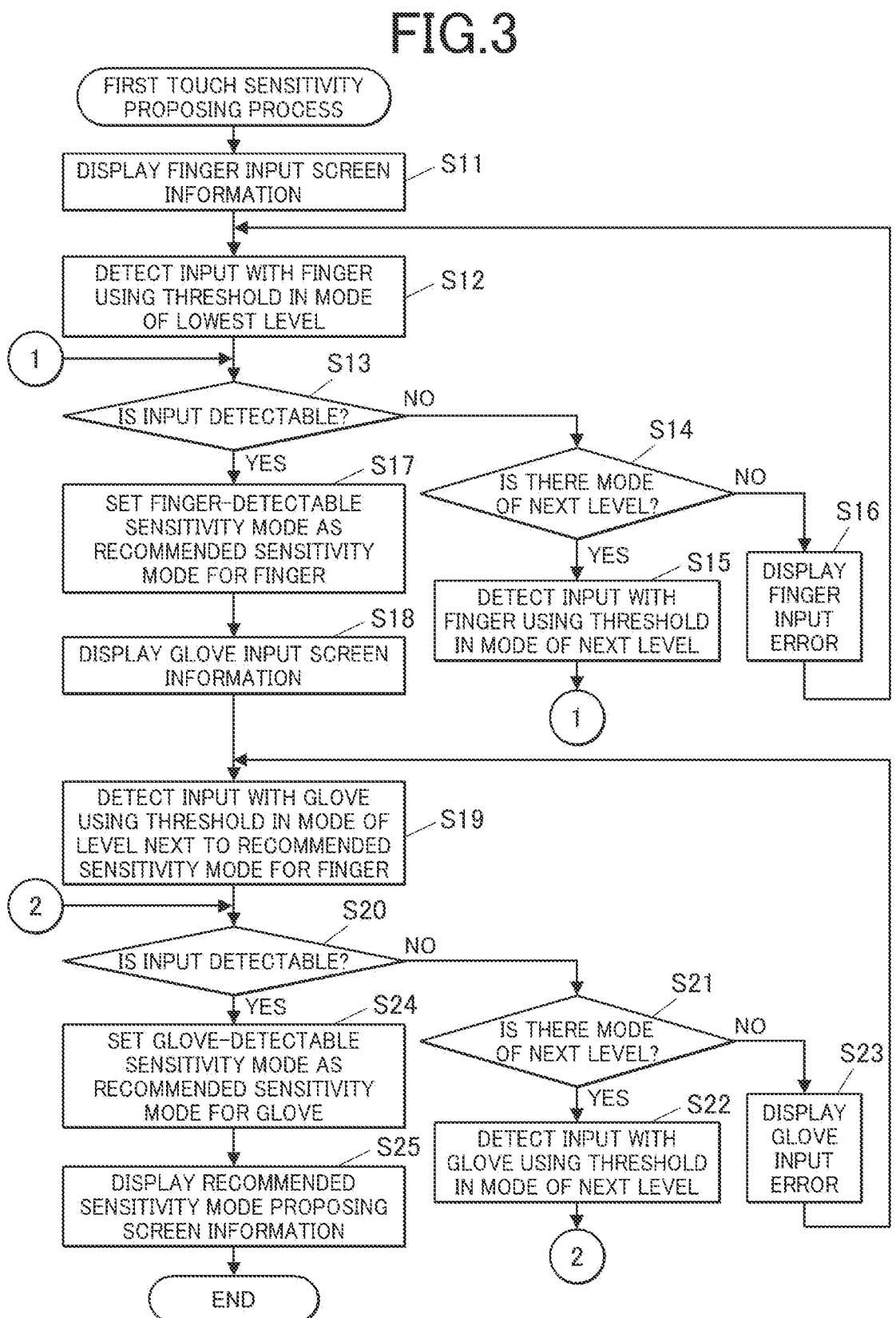
FIG. 3 is a flowchart illustrating a first touch sensitivity proposing process.
Figures 4A, 4B, 4C:
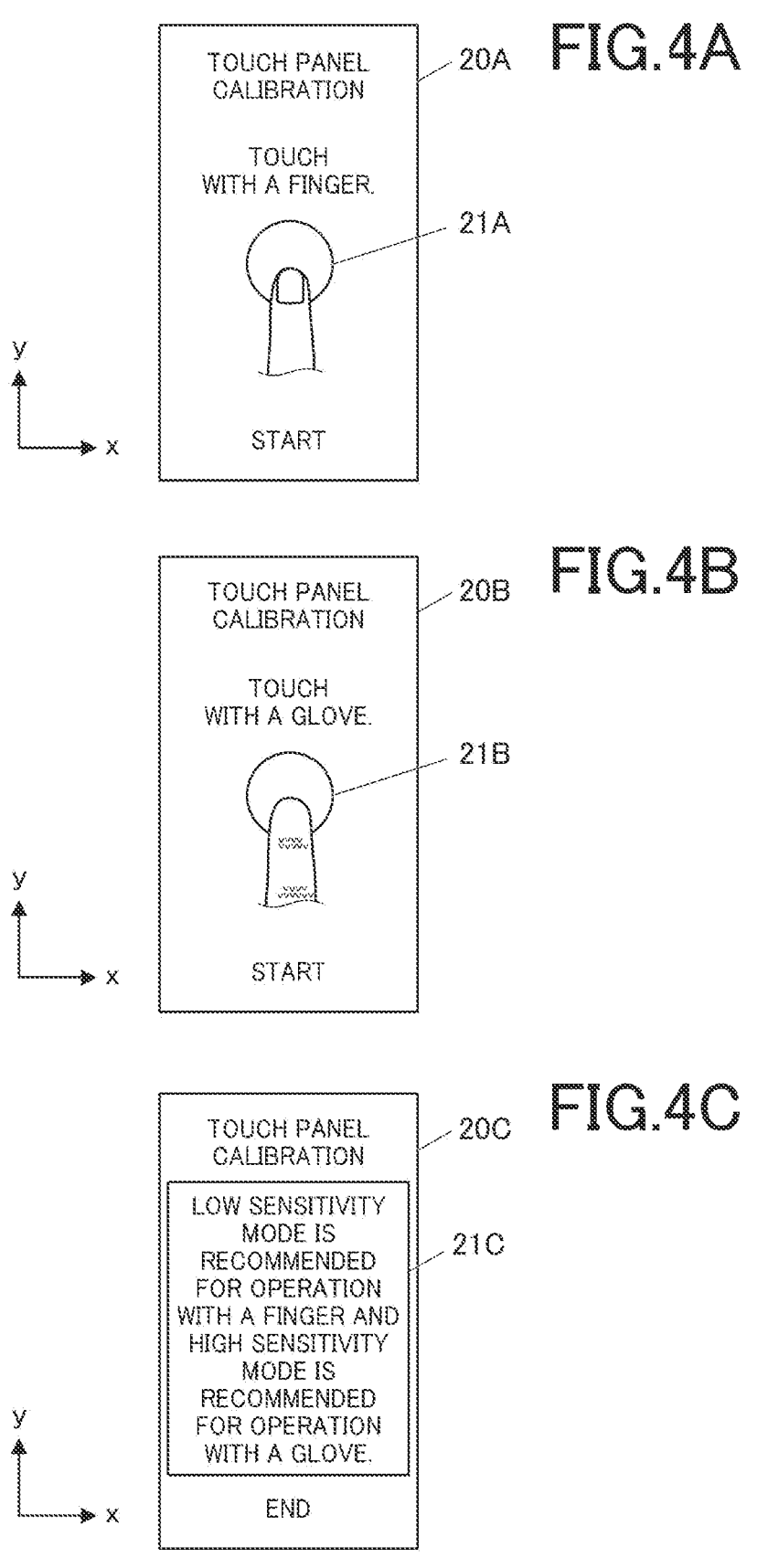
FIG. 4A illustrates a finger input screen.
FIG. 4B illustrates a glove input screen.
FIG. 4C illustrates a recommended sensitivity mode proposing screen.
Figure 5A:
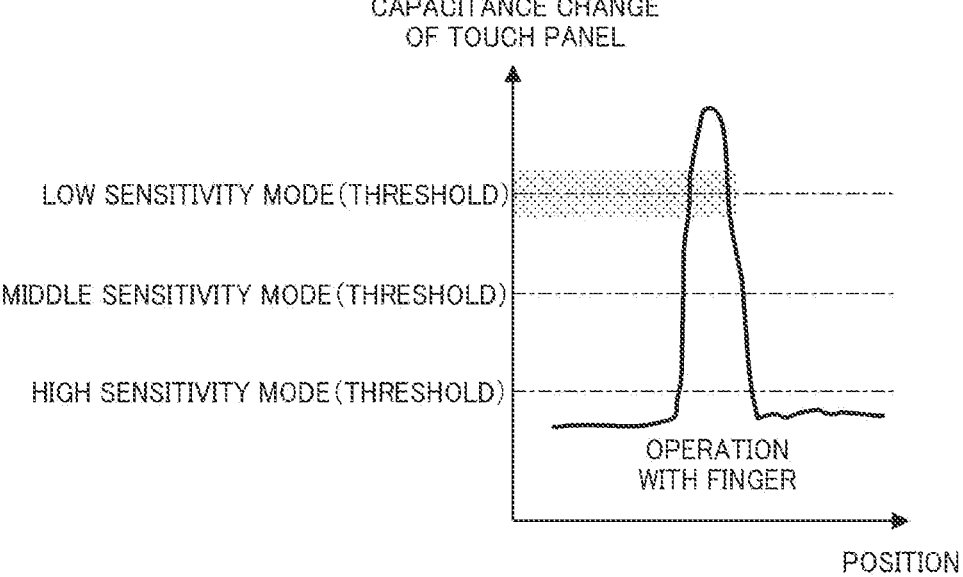
FIG. 5A illustrates capacitance change of a touch panel in response to a touch input with a finger with respect to position.
Figure 5B:
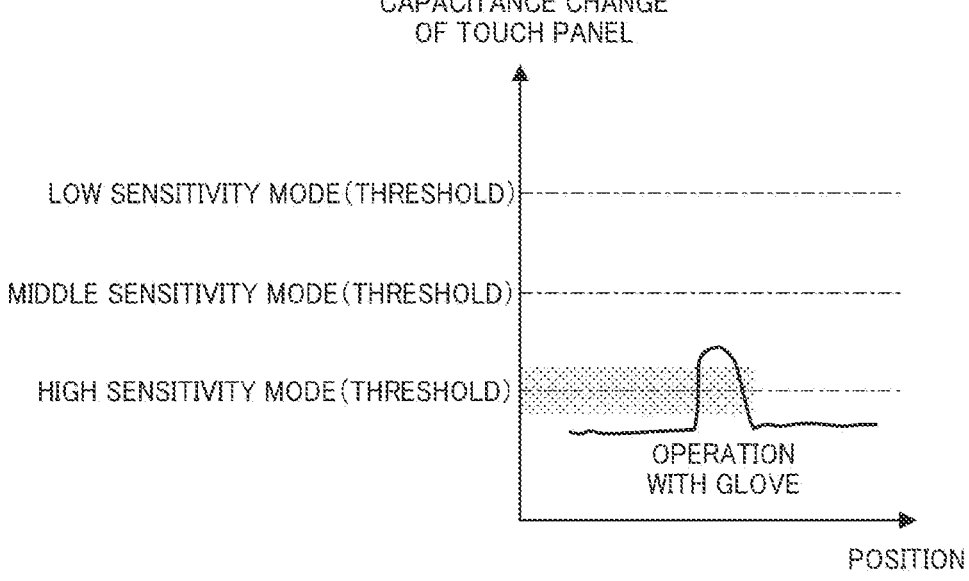
FIG. 5B illustrates capacitance change of the touch panel in response to a touch input with a glove with respect to position.

Next, the operation of the handheld terminal 10 in the present embodiment will be described with reference to FIG. 3 to FIG. 5B. FIG. 3 is a flowchart illustrating the first touch sensitivity proposing process. FIG. 4A illustrates a finger input screen 20A. FIG. 4B illustrates a glove input screen 20B. FIG. 4C illustrates a recommended sensitivity mode proposing screen 20C. FIG. 5A illustrates the capacitance change of the touch panel 12B in response to a touch input with a finger with respect to the position. FIG. 5B illustrates the capacitance change of the touch panel 12B in response to a touch input with a glove with respect to the position.

In the present embodiment, three sensitivity modes are prepared in advance, which differ from each other in the threshold of capacitance change in response to a touch input with a medium to the touch panel 12B. Sensitivity of the touch panel is the lowest in a low-sensitivity mode (the threshold of capacitance change for judgement of a touch input is the highest). Sensitivity of the touch panel is the second lowest in a middle-sensitivity mode (the threshold of capacitance change for judgement of a touch input is the second highest). Sensitivity of the touch panel is the highest in a high-sensitivity mode (the threshold of capacitance change for judgement of a touch input is the lowest).

Preferably, the sensitivity mode appropriate for the user's medium (a finger or a glove) is set before the user performs the business processes by performing a touch input to the touch panel 12B of the handheld terminal 10. For this purpose, the CPU executes the first touch sensitivity proposing process in the handheld terminal 10. In the first touch sensitivity proposing process, touch inputs with the user's finger and glove are sequentially received, and a recommended sensitivity mode for each medium is proposed based on the capacitance change in response to the touch input with each medium.

For example, triggered by the instruction to execute the first touch sensitivity proposing process that is input by the user through the operation receiver 12, the CPU 11 performs the first touch sensitivity proposing process according to the first touch sensitivity proposing program P1 stored in the storage 15.

As illustrated in FIG. 3, first, the CPU 11 causes the display 14 to display finger input screen information (Step S11). In Step S11, for example, the finger input screen 20A illustrated in FIG. 4A is displayed. The finger input screen 20A includes character information that prompts the user to perform a touch input with a finger, and an input area 21A. The input area 21A is a display area that receives a touch input with a finger. The finger input screen 20A is a screen that receives the touch input with the finger only as a medium. The input area 21A roughly indicates the area that receives the touch input with the finger, and the touch input with the finger can also be received in areas other than the input area 21A. However, the touch input with the finger may be received only in the input area 21A.

Then, the CPU 11 selects the sensitivity mode of the lowest level, receives a touch input with a finger on the touch panel 12B, detects the capacitance change of the touch panel 12B in response to the touch input, and detects the touch input with the finger by using the detected capacitance change and the threshold of capacitance change in the currently selected sensitivity mode (Step S12). The sensitivity mode of the lowest level is the sensitivity mode with the lowest sensitivity (maximum threshold), which is the low-sensitivity mode in the present embodiment. In Step S12, the touch input with the finger is judged to be detected when the detected capacitance change is equal to or greater than the threshold, and not detected when the detected capacitance change is lower than the threshold.

Then, based on the result detected in Step S12 or Step S15, the CPU 11 judges whether or not the touch input with the finger is detectable (the touch input with the finger has been detected) using the currently selected threshold (Step S13). If the touch input with the finger is not detectable (Step S13; NO), the CPU 11 judges whether or not there is a sensitivity mode of the next level (Step S14). The sensitivity mode of the next level is a sensitivity mode in which sensitivity is higher by one step than the currently selected sensitivity mode. For example, when the low-sensitivity mode is currently selected, the sensitivity mode of the next level is the medium sensitivity mode.

If there is a sensitivity mode of the next level (Step S14; YES), the CPU 11 selects the sensitivity mode of the next level, receives the touch input with the finger on the touch panel 12B, detects the capacitance change in response to the touch input, detects the touch input with the finger by using the detected capacitance change and the threshold of capacitance change in the currently selected sensitivity mode (Step S15), and moves the process to Step S13.

If there is no sensitivity mode of the next level (Step S14; NO), which means that the sensitivity mode of the highest level is currently selected, the CPU 11 causes the display 14 to display error information indicating an error that no touch input with the finger is detectable in any sensitivity mode (Step S16) and moves the process to Step S12. The sensitivity mode of the highest level is the sensitivity mode with the highest sensitivity (lowest threshold), which is the high-sensitivity mode in the present embodiment. The error information displayed in Step S16 includes, for example, a message prompting the user to retry a touch input with the finger.

If a touch input with the finger is detectable (Step S13; YES), the CPU 11 sets the sensitivity mode in which the touch input with the finger is detected in Step S13 as the recommended sensitivity mode for the finger (Step S17). That is, through the processes from Step S12 to Step S17, of the multiple sensitivity modes (multiple thresholds), the sensitivity mode in which the touch input with the finger is detectable and has the lowest sensitivity (the highest threshold) is set as the recommended sensitivity mode for the finger.

The CPU 11 then causes the display 14 to display glove input screen information (Step S18). In Step S18, for example, the glove input screen 20B illustrated in FIG. 4B is displayed. The glove input screen 20B includes a message prompting the user to perform a touch input with a glove, and an input area 21B. The input area 21B is a display area that receives a touch input with a glove. The glove input screen 20B is a screen that receives a touch input with the glove only as a medium. The input area 21B roughly indicates the area that receives the touch input with the glove, and the touch input with the glove can also be received in areas other than the input area 21B. However, a touch input with the glove may be received only in the input area 21B.

Then, the CPU 11 selects the sensitivity mode of the level next to the recommended sensitivity mode set in Step S17, receives a touch input with a glove on the touch panel 12B, detects the capacitance change in response to the touch input, and detects the touch input with the glove by using the detected capacitance change and the threshold of capacitance change in the currently selected sensitivity mode (Step S19). Since the touch panel 12B is less responsive to a glove than to a finger, detection of a touch input with a glove requires a higher sensitivity (less threshold of capacitance change) than detection of a touch input with a finger. In the first touch sensitivity proposing process, a touch input with a finger is followed by a touch input with a glove.

Then, based on the result detected in Step S19 or Step S22, the CPU 11 judges whether or not the touch input with the glove is detectable (the touch input with the glove has been detected) at the currently selected threshold (Step S20). If the touch input with the glove is not detectable (Step S20; NO), the CPU 11 judges whether or not there is a sensitivity mode of the next level (Step S21).

If there is a sensitivity mode of the next level (Step S21; YES), the CPU 11 selects the sensitivity mode of the next level, receives a touch input with the glove on the touch panel 12B, detects the capacitance change in response to the touch input, detects the touch input with the glove by using the detected capacitance change and the threshold of capacitance change in the currently selected sensitivity mode (Step S22), and moves the process to Step S20.

If there is no sensitivity mode of the next level (Step S21; NO), which means that the sensitivity mode of the highest level is currently selected, the CPU 11 causes the display 14 to display error information indicating an error that a touch input with the glove cannot be detected in any sensitivity mode (Step S23) and moves the process to Step S19. The error information displayed in Step S23 includes, for example, a message prompting the user to retry a touch input with the glove. The error information displayed in Step S23 may include a message prompting the user to try a touch input with a thinner glove than the one currently in use.

If a touch input with the glove is detectable (Step S20; YES), the CPU 11 sets the sensitivity mode in which the touch input with the glove is detected in Step S20 as the recommended sensitivity mode for the glove (Step S24). That is, through the processes from Step S19 to Step S24, of the multiple sensitivity modes (multiple thresholds), the sensitivity mode in which the touch input with the glove is detectable and has the lowest sensitivity (the highest threshold) is set as the recommended sensitivity mode for the glove.

Then, the CPU 11 causes the display 14 to display recommended sensitivity mode proposing screen information including a message proposing, to the user, the recommended sensitivity mode for the finger set in Step S17 and the recommended sensitivity mode for the glove set in Step S24 (Step S25) and finishes the first touch sensitivity proposing process. In Step S25, for example, a recommended sensitivity mode proposing screen 20C illustrated in FIG. 4C is displayed. The recommended sensitivity mode proposing screen 20C includes message 21C proposing, to the user, the recommended sensitivity mode for the finger set in Step S17 and the recommended sensitivity mode for the glove set in Step S24.

Referring to FIG. 5A and FIG. 5B, an example of setting the sensitivity modes for a touch input with a finger and a touch input with a glove will be described. FIG. 5A illustrates the capacitance change detected by the touch panel 12B in response to a touch input with a finger with respect to the position in the +x direction on the display panel of the display 14 with a solid line. FIG. 5A is a schematic diagram illustrating, for example, the capacitance change detected on a line along the x direction and passing through the center of the input area 21A that receives a touch input with a finger. The position in the +x direction on the display panel and the detected capacitance change are similarly defined in other diagrams illustrating the capacitance change with respect to the position.

In this example, in the first touch sensitivity proposing process, the low-sensitivity mode is selected in Step S12, and immediately after that, a touch input with the finger is detected in Step S13. The low-sensitivity mode is then set as the recommended sensitivity mode for the finger in Step S17.

FIG. 5B illustrates the capacitance change detected by the touch panel 12B in response to a touch input with a glove with respect to the position in the +x direction on the display panel of the display 14 with a solid line. In Step S19 of the first touch sensitivity proposing process, the middle-sensitivity mode, in which sensitivity is higher than in the recommended sensitivity mode for the finger, is selected. Then, a touch input with a glove is not detected in Step S20, the high-sensitivity mode, which is the sensitivity mode of the next level, is selected in the subsequent Step S22, and a touch input with a glove is detected in Step S20. Then, the high-sensitivity mode is set as the recommended sensitivity mode for the glove in Step S24. In Step S25, the recommended sensitivity mode proposing screen 20C in FIG. 4C is displayed. As shown in the message 21C, the low-sensitivity mode is recommended as the recommended sensitivity mode for the finger, and the high-sensitivity mode is recommended as the recommended sensitivity mode for the glove.

According to the above embodiment, the handheld terminal 10 includes the touch panel 12B that receives a touch input to the display screen of the display 14 and the CPU 11. The CPU 11 causes the display 14 to sequentially display multiple input screens (the finger input screen 20A and the glove input screen 20B) that receive touch inputs from respective multiple media (a finger and a glove). The touch panel 12B receives touch inputs with the media through the respective input screens. The CPU 11 detects which of the multiple thresholds is exceeded by the capacitance change of the touch panel 12B in response to each touch input, and determines the sensitivity mode corresponding to the threshold of capacitance change to be used in judgement on whether or not a touch input to the touch panel 12B is made based on the detection results for each of the multiple media.

Thus, the appropriate sensitivity (threshold of capacitance change) of the touch panel can be easily and quickly determined for each of the multiple media by a touch input to the finger input screen 20A with a finger and to the glove input screen 20B with a glove in this order, and operability by a touch input by the user is improved.

The CPU 11 causes the display 14 to display the finger input screen 20A for a touch input with a finger before the glove input screen 20B for a touch input with a glove. Of the multiple media, the finger is the first medium that is detectable using a high threshold of capacitance change in response to a touch input, and the glove is the second medium that is detectable using a lower threshold of capacitance change than the finger. The CPU 11 determines the first threshold (and the corresponding sensitivity mode) based on the touch input with a finger and then determines the second threshold (and the corresponding sensitivity mode) based on the touch input with a glove using a threshold lower than the first threshold. The first threshold corresponds to the capacitance change in response to the touch input with the finger. The second threshold corresponds to the capacitance change in response to the touch input with the glove. Therefore, the threshold of capacitance change of the touch panel is determined in a simple process, and the appropriate thresholds of capacitance change can be determined in a short period.

The CPU 11 also determines the sensitivity mode corresponding to the threshold of capacitance change for each medium as the recommended sensitivity mode. Therefore, the user can easily recognize the sensitivity mode suitable for each medium.

The CPU 11 also causes the display 14 to display the message as displaying information that recommends the sensitivity mode for each medium corresponding to the determined threshold of capacitance change. Therefore, the user can visually recognize an appropriate sensitivity mode for each medium and set the desired appropriate sensitivity mode.

In the present embodiment described above, the CPU 11 displays the finger input screen 20A, determines the first threshold (and the corresponding sensitivity mode) of a capacitance change when the displayed finger input screen 20A receives a touch input with a finger, then displays the glove input screen 20B in a sensitivity mode whose threshold is lower than the first threshold, and determines the second threshold (and the corresponding sensitivity mode) of a capacitance change when the glove input screen 20B receives a touch input with a glove. However, the determination method of the present disclosure is not limited to this. The CPU 11 may display the glove input screen 20B, determine the threshold (and the corresponding sensitivity mode) of a capacitance change when the glove input screen 20B receives a touch input with a glove, then display the finger input screen 20A, and determine the threshold (and the corresponding sensitivity mode) of a capacitance change when the displayed finger input screen 20A receives a touch input with a finger.

Second Embodiment

Figure 6:
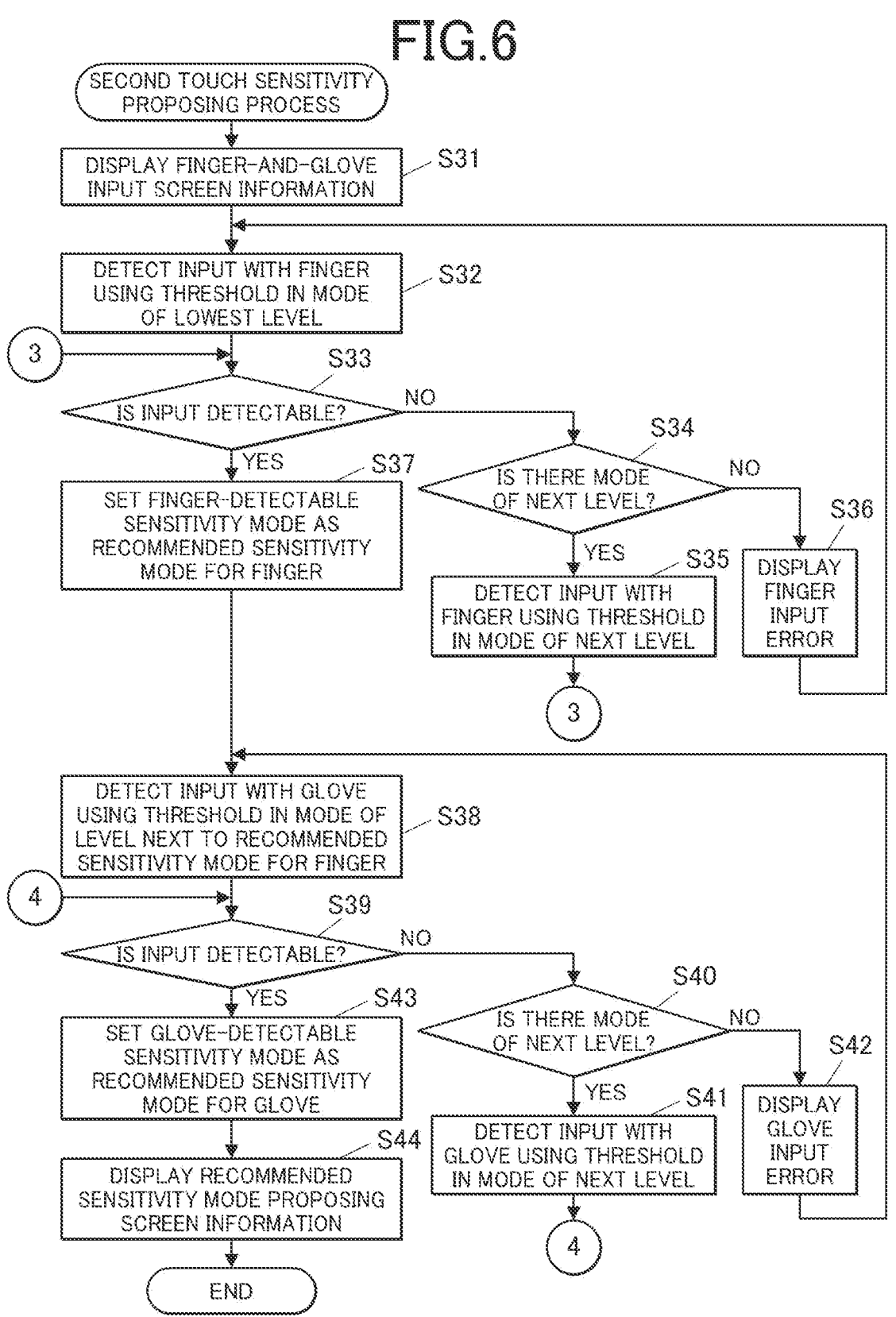
FIG. 6 is a flowchart illustrating a second touch sensitivity proposing process.
Figure 7A:
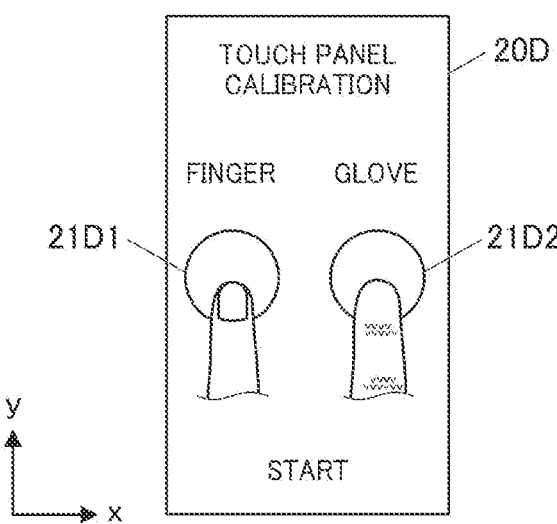
FIG. 7A illustrates a finger-and-glove input screen.
Figure 7B:
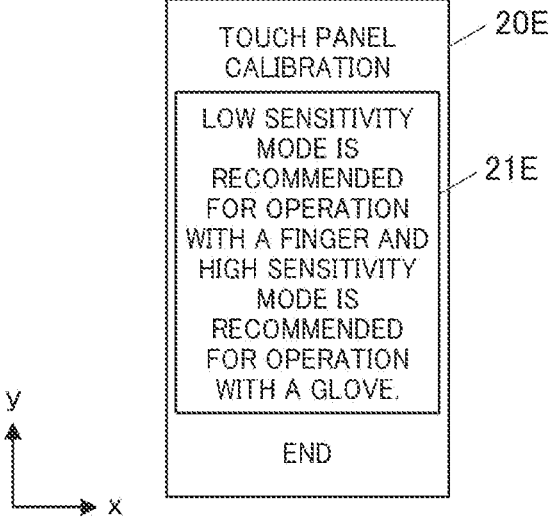
FIG. 7B illustrates a recommended sensitivity mode proposing screen.
Figure 8:
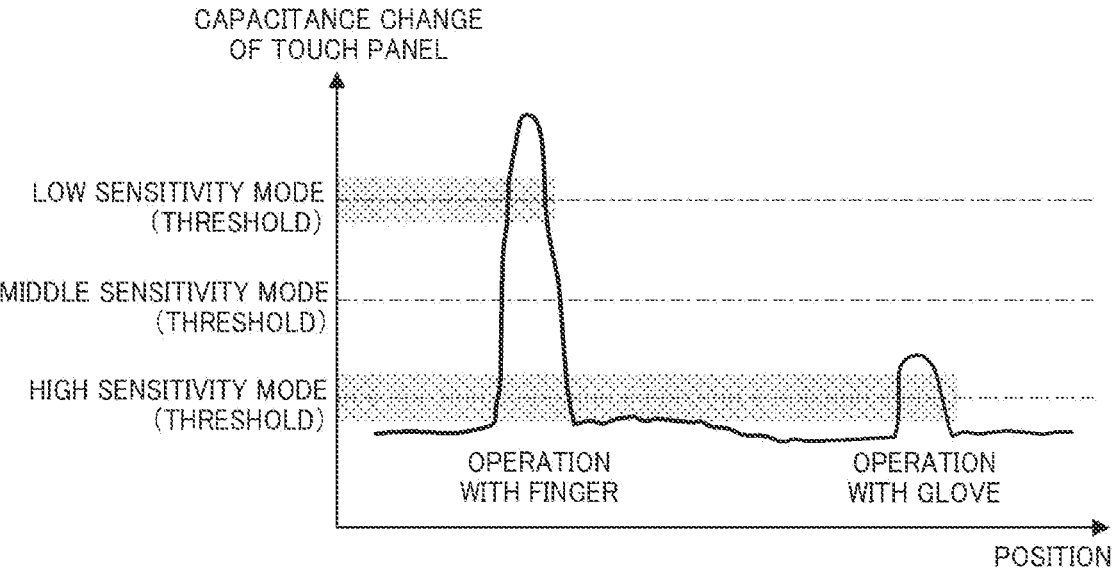
FIG. 8 illustrates capacitance change of the touch panel with respect to position in response to touch inputs with a finger and with a glove in sensitivity modes of three levels.

With reference to FIG. 6 to FIG. 9, the second embodiment of the present disclosure will be described. FIG. 6 is a flowchart illustrating the second touch sensitivity proposing process. FIG. 7A illustrates a finger-and-glove input screen 20D. FIG. 7B illustrates a recommended sensitivity mode proposing screen 20E. FIG. 8 illustrates the capacitance change of the touch panel 12B with respect to the position in response to touch inputs with a finger and with a glove in sensitivity modes of three levels.

In the first embodiment, the touch input with a finger and the touch input with a glove are sequentially performed in order to determine the recommended sensitivity mode. In the second embodiment, the touch input with a finger and the touch input with a glove to determine the recommended sensitivity mode can be performed simultaneously (while one input screen is displayed).

As the device configuration in the present embodiment, the handheld terminal 10 is used in the same manner as the first embodiment. However, instead of the first touch sensitivity proposing program P1, the second touch sensitivity proposing program for executing the second touch sensitivity proposing process described below is stored in the storage 15.

Next, the operation of the handheld terminal 10 in the present embodiment will be described with reference to FIG. 6 to FIG. 8. In the present embodiment, the low-sensitivity mode, the middle-sensitivity mode, and the high-sensitivity mode are prepared in advance.

The second touch sensitivity proposing process is executed in the handheld terminal 10. In the second touch sensitivity proposing process, the handheld terminal 10 receives the touch inputs by the user with the finger and with the glove simultaneously and proposes a recommended sensitivity mode for each medium based on the capacitance change in response to the touch input with each medium.

For example, triggered by the instruction to execute the second touch sensitivity proposing process that is input by the user through the operation receiver 12, the CPU 11 performs the second touch sensitivity proposing process according to the second touch sensitivity proposing program stored in the storage 15.

As illustrated in FIG. 6, first, the CPU 11 causes the display 14 to display finger-and-glove input screen information (Step S31). In Step S31, for example, the finger-and-glove input screen 20D illustrated in FIG. 7A is displayed. The finger-and glove input screen 20D includes character information that prompts the user to perform touch inputs with a finger and with a glove, and input areas 21D1,21D2. The input area 21D1 is a display area that receives a touch input with a finger. The input area 21D2 is a display area that receives a touch input with a glove. The finger-and glove input screen 20D receives a touch input with a finger and a touch input with a glove simultaneously. Therefore, only the input area 21D1 is configured to receive the touch input with a finger, and only the input area 21D2 is configured to receive the touch input with a glove.

The input areas 21D1, 21D2 are arranged at different positions from each other in the finger-and-glove input screen 20D. Specifically, the input area 21D1 is arranged at a predetermined position in the y direction and closer to the −x direction side of the finger-and-glove input screen 20D. The input area 21D2 is arranged at the same predetermined position in the y direction as the input area 21D1 and at a position on the +x direction side of the input area 21D1.

Then, the CPU 11 selects the sensitivity mode of the lowest level, receives a touch input with a finger on the touch panel 12B at the position based on the position information of the input area 21D1, detects the capacitance change of the input area 21D1 in response to the touch input, and detects the touch input with the finger by using the detected capacitance change and the threshold of capacitance change in the currently selected sensitivity mode (Step S32). Step S33 and Step S34 are similar to Step S13 and Step S14 in the first touch sensitivity proposing process illustrated in FIG. 3, respectively.

If there is a sensitivity mode of the next level (Step S34; YES), the CPU 11 selects the sensitivity mode of the next level, receives the touch input with the finger on the touch panel 12B at the position based on the position information of the input area 21D1, detects the capacitance change in response to the touch input, detects the touch input with the finger by using the detected capacitance change and the threshold of capacitance change in the currently selected sensitivity mode (Step S35), and moves the process to Step S33. Step S36 and Step S37 are similar to Step S16 and Step S17 illustrated in FIG. 3, respectively. That is, through the processes from Step S32 to Step S37, of the multiple sensitivity modes (multiple thresholds), the sensitivity mode in which a touch input with the finger is detectable and has the lowest sensitivity (the highest threshold) is set as the recommended sensitivity mode for the finger.

Then, the CPU 11 selects the sensitivity mode of the level next to the recommended sensitivity mode set in Step S37, receives a touch input with a glove on the touch panel 12B at the position based on the position information of the input area 21D2, detects the capacitance change in response to the touch input, and detects the touch input with the glove by using the detected capacitance change and the threshold of capacitance change in the currently selected sensitivity mode (Step S38). Step S39 and Step S40 are similar to Step S20 and Step S21 illustrated in FIG. 3, respectively.

If there is a sensitivity mode of the next level (Step S40; YES), the CPU 11 selects the sensitivity mode of the next level, receives a touch input with the glove on the touch panel 12B at the position based on the position information of the input area 21D2, detects the capacitance change in response to the touch input, detects the touch input with the glove by using the detected capacitance change and the threshold of capacitance change in the currently selected sensitivity mode (Step S41), and moves the process to Step S39. Step S42 and Step S43 are similar to Step S22 and Step S23 illustrated in FIG. 3, respectively. That is, through the processes from Step S38 to Step S43, of the multiple sensitivity modes (multiple thresholds), the sensitivity mode in which a touch input with the glove is detectable and has the lowest sensitivity (the highest threshold) is set as the recommended sensitivity mode for the glove.

Then, the CPU 11 causes the display 14 to display recommended sensitivity mode proposing screen information including a message proposing, to the user, the recommended sensitivity mode for the finger set in Step S37 and the recommended sensitivity mode for the glove set in Step S43 (Step S44) and finishes the second touch sensitivity proposing process. In Step S44, for example, a recommended sensitivity mode proposing screen 20E illustrated in FIG. 7B is displayed. The recommended sensitivity mode proposing screen 20E includes a message 21E that proposes the recommended sensitivity mode for the finger set in Step S37 and the recommended sensitivity mode for the glove set in Step S43 to the user.

Referring to FIG. 8, an example of setting the sensitivity mode in a touch input with a finger and a touch input with a glove will be described. FIG. 8 illustrates the capacitance change detected by the touch panel 12B in response to a touch input with a finger and a touch input with a glove with respect to the position in the +x direction on the display panel of the display 14 with a solid line.

In this example, in the second touch sensitivity proposing process, the low-sensitivity mode is selected in Step S32 and immediately after that, the touch input with the finger is detected in Step S33. The low-sensitivity mode is then set as the recommended sensitivity mode for the finger in Step S37.

Then, in Step S38, the middle-sensitivity mode, in which sensitivity is higher than in the recommended sensitivity mode for the finger, is selected. Then, a touch input with a glove is not detected in Step S39, the high-sensitivity mode, which is the sensitivity mode of the next level, is selected in the subsequent Step S41, and a touch input with a glove is detected in Step S39. Then, the high-sensitivity mode is set as the recommended sensitivity mode for the glove in Step S43. In Step S44, the recommended sensitivity mode proposing screen 20E in FIG. 7B is displayed. In the same manner as the message 21E, the low-sensitivity mode is recommended as the recommended sensitivity mode for the finger, and the high-sensitivity mode is recommended as the recommended sensitivity mode for the glove.

According to the above embodiment, the handheld terminal 10 includes the CPU 11 and the touch panel 12B that receives a touch input to the display screen of the display 14. The CPU 11 causes the display 14 to display the finger-and-glove input screen 20D, which simultaneously receives touch inputs with respective media (a finger and a glove). Through the finger-and-glove input screen 20D, the touch panel 12B receives touch inputs with the respective media. The CPU 11 detects which of the multiple thresholds is exceeded by the capacitance change of the touch panel 12B in response to the touch input and determines the threshold of capacitance change (and the sensitivity mode corresponding thereto) for each of the multiple media used in judgement on whether or not a touch input to the touch panel 12B is made based on the detection results.

Thus, the appropriate sensitivity (threshold of capacitance change) of the touch panel can be easily and quickly determined for each of the multiple media by simultaneous touch inputs to the finger-and glove input screen 20D with a finger and a glove, and operability by a touch input by the user is improved.

Of the multiple media, the finger is the first medium that is detectable using a highest threshold of capacitance change in response to a touch input, and the glove is the second medium that is detectable using a lower threshold of capacitance change than the finger. The CPU 11 determines the first threshold (and the corresponding sensitivity mode) based on a touch input with the finger and then determines the second threshold (and the corresponding sensitivity mode) based on a touch input with the glove starting from the threshold lower than the first threshold. The first threshold corresponds to the capacitance change in response to the touch input with the finger. The second threshold corresponds to the capacitance change in response to the touch input with the glove. Therefore, the threshold of capacitance change of the touch panel is determined in a simple process, and the appropriate sensitivity of the touch panel can be determined in a short period.

The finger-and-glove input screen 20D includes input areas 21D1 and 21D2 that receive touch inputs with respective media separately and that are at different positions from each other. The CPU 11 detects the presence or absence of a touch input with each of the media using the position information of the input areas 21D1 and 21D2. This enables more reliable detection of a touch input with multiple media in the finger-and-glove input screen 20D.

The sensitivity modes of three levels are prepared in advance in the second embodiment, but sensitivity modes are not limited to these. For example, sensitivity modes of multiple levels other than three levels may be prepared in advance.

Figure 9:
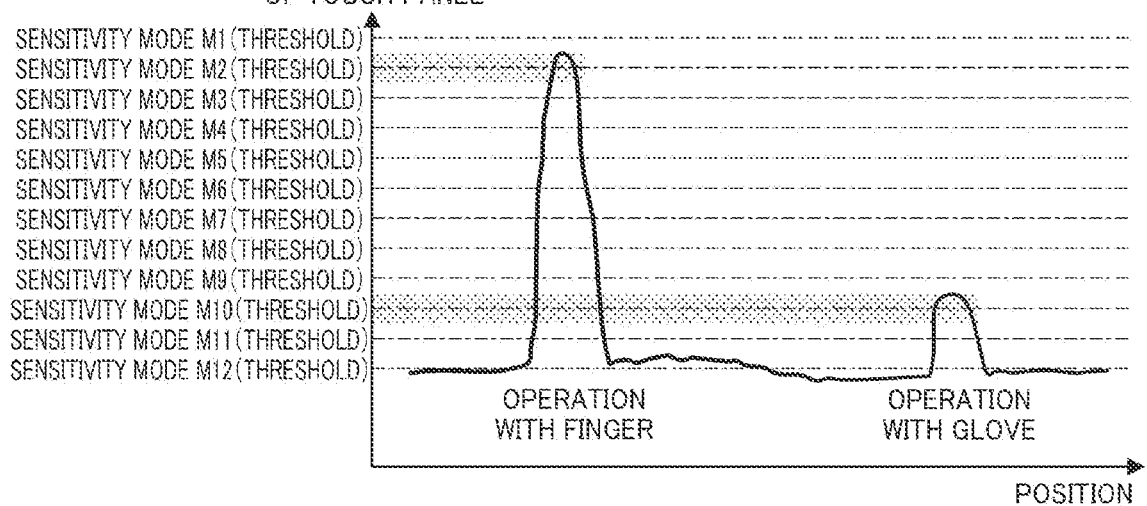
FIG. 9 illustrates capacitance change detected by the touch panel in response to touch inputs with a finger and with a glove with respect to position when there are sensitivity modes of twelve levels.

Referring to FIG. 9, an example in which sensitivity modes of twelve levels are prepared in advance will be described. FIG. 9 illustrates the capacitance change detected by the touch panel 12B in response to touch inputs with a finger and with a glove with respect to the position in an example where sensitivity modes of twelve levels are prepared in advance.

The sensitivity modes of twelve levels range from the sensitivity mode M1 that is the lowest level to the sensitivity mode M12 that is the highest level. The handheld terminal 10 executes the second touch sensitivity proposing process in the same manner as the second embodiment.

In this example, in the second touch sensitivity proposing process, the sensitivity mode M1 is selected in Step S32, a touch input with the finger is not detected in Step S33, and the sensitivity mode M2 of the next level is selected in Step S35. The sensitivity mode M2 is then set as the recommended sensitivity mode for the finger in Step S37.

Then, in Step S38, the sensitivity mode M3, in which sensitivity is higher than in the recommended sensitivity mode for the finger, is selected. Then, the CPU repeats the processes including Step S39 in which a touch input with a glove is not detected and Step S41 in which the sensitivity mode of the next level is selected. Then, when the sensitivity mode M10 is selected in Step S41, the touch input with a glove is detected in Step S39. Then, the sensitivity mode M10 is set as the recommended sensitivity mode for the glove in Step S43. In Step S44, the recommended sensitivity mode proposing screen is displayed. The sensitivity 2 is recommended as the recommended sensitivity mode for the finger, and the sensitivity mode M10 is recommended as the recommended sensitivity mode for the glove.

Third Embodiment

Figure 10:
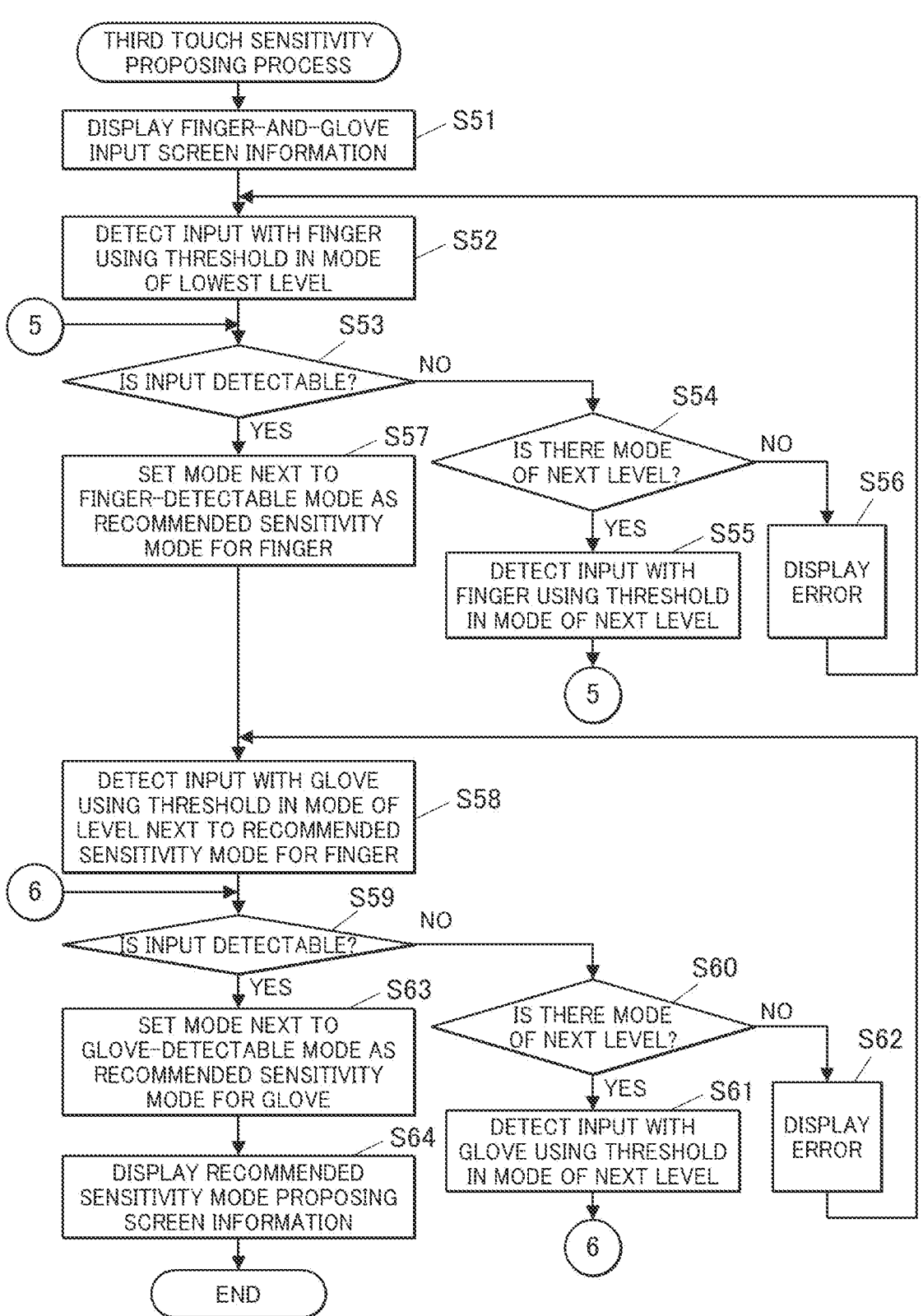
FIG. 10 is a flowchart illustrating a third touch sensitivity proposing process.
Figure 11:
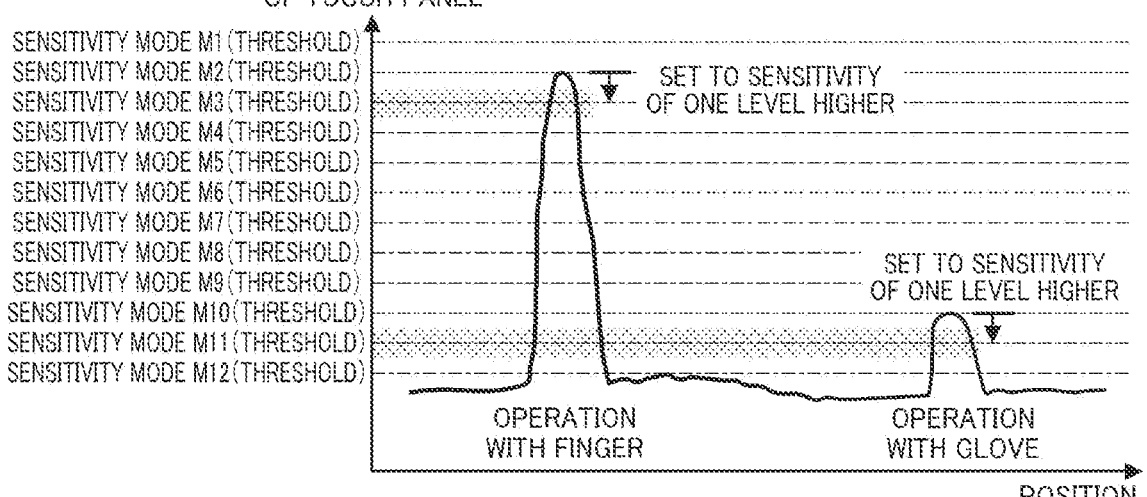
FIG. 11 illustrates capacitance change detected by the touch panel in response to touch inputs with a finger and with a glove with respect to position when there are sensitivity modes of twelve levels.

With reference to FIG. 10 and FIG. 11, the third embodiment of the present disclosure will be described. FIG. 10 is a flowchart illustrating the third touch sensitivity proposing process. FIG. 11 illustrates the capacitance change of the touch panel 12B with respect to the position in response to touch inputs with a finger and with a glove when there are sensitivity modes of twelve levels.

In the second embodiment, for each medium, the level of the selected sensitivity mode is the lowest first and then is heightened one by one, and the sensitivity mode in which the touch input is detected is set as the recommended sensitivity mode. In the present embodiment, the level of the selected sensitivity mode is the lowest first and then is heightened one by one for each medium, and the sensitivity mode in which sensitivity is one level higher than that in the sensitivity mode in which the touch input is detected is set as the recommended sensitivity mode.

As the device configuration in the present embodiment, the handheld terminal 10 is used in the same manner as the first embodiment. However, instead of the first touch sensitivity proposing program P1, the third touch sensitivity proposing program for executing the third touch sensitivity proposing process described below is stored in the storage 15.

Next, the operation of the handheld terminal 10 in the present embodiment will be described with reference to FIG. 10 and FIG. 11. In the present embodiment, the twelve sensitivity modes M1 to M12 are prepared in advance in the same manner as the modification of the second embodiment (FIG. 9).

The third touch sensitivity proposing process is executed in the handheld terminal 10. In the third touch sensitivity proposing process, the handheld terminal 10 receives touch inputs with the user's finger and glove simultaneously and proposes a recommended sensitivity mode for each medium based on the capacitance change of the touch input with each medium. The recommended sensitivity mode in the present embodiment is the sensitivity mode of the second lowest sensitivity among the sensitivity mode (s) in which a touch input is detectable.

For example, triggered by the instruction to execute the third touch sensitivity proposing process that is input by the user through the operation receiver 12, the CPU 11 performs the third touch sensitivity proposing process according to the third touch sensitivity proposing program stored in the storage 15.

Step S51 to Step S56 illustrated in FIG. 10 are similar to Step S31 to Step S36 in the second touch sensitivity proposing process illustrated in FIG. 6, respectively. If a touch input with the finger is detectable (Step S53; YES), the CPU 11 sets the sensitivity mode of the level next to that of the sensitivity mode in which the touch input with the finger is detected in Step S53 as the recommended sensitivity mode for the finger (Step S57). That is, through the processes from Step S52 to Step S57, of the multiple sensitivity modes (multiple thresholds), the sensitivity mode in which sensitivity is one level higher than that in the sensitivity mode in which the touch input is detectable for the first time (threshold that is one level lower than the first detected threshold) is set as the recommended sensitivity mode for the finger.

Step S58 to Step S62 are similar to Step S38 to Step S42 illustrated in FIG. 6, respectively. If a touch input with the glove is detectable (Step S59; YES), the CPU 11 sets the sensitivity mode of a level next to that of the sensitivity mode in which the touch input with the glove is detected in Step S59 as the recommended sensitivity mode for the glove (Step S63). When the sensitivity mode of the next level is the sensitivity mode of the highest level in Step S63, for example, the sensitivity mode of the highest level is set as the recommended sensitivity mode. That is, through the processes from Step S58 to Step S63, of the multiple sensitivity modes (multiple thresholds), the sensitivity mode of one level higher than that of the sensitivity mode in which a touch input with the glove is detectable for the first time (threshold that is one level lower than the first detected one) is set as the recommended sensitivity mode for the glove. Step S64 is similar to Step S44 illustrated in FIG. 6.

Referring to FIG. 11, an example of setting the sensitivity modes used in touch inputs with a finger and a glove will be described. FIG. 11 illustrates the capacitance change detected by the touch panel 12B in response to touch inputs with the finger and with the glove with respect to the position in the +x direction on the display panel of the display 14 with a solid line.

In this example, in the third touch sensitivity proposing process, the sensitivity mode M1 is selected in Step S52, a touch input with the finger is not detected in Step S53, and the sensitivity mode M2, which is the next level, is selected in Step S55. The sensitivity mode M3, which is the level next to the sensitivity mode M2, is then set as the recommended sensitivity mode for the finger in Step S57.

Then, in Step S58, the sensitivity mode M4, in which sensitivity is higher than in the recommended sensitivity mode for the finger, is selected. Then, the CPU 11 repeats the processes including Step S59 in which a touch input with a glove is not detected and Step S61 in which the sensitivity mode of the next level is selected. Then, when the sensitivity mode M10 is selected in Step S61, the touch input with a glove is detected in Step S59. Then, the sensitivity mode M11 that is the sensitivity mode of the next level of the sensitivity mode M10 is set as the recommended sensitivity mode for the glove in Step S63. In Step S64, the recommended sensitivity mode proposing screen is displayed. The sensitivity mode M3 is recommended as the recommended sensitivity mode for the finger, and the sensitivity mode M11 is recommended as the recommended sensitivity mode for the glove.

According to the above embodiment, the CPU 11 determines the sensitivity whose mode threshold of capacitance change is lower than and closest to (that is, the sensitivity mode one level higher than) the threshold of the sensitivity mode in which the touch input with each medium has been detected for the first time to the recommended sensitivity mode. When the recommended sensitivity mode is the sensitivity mode in which the touch input with each medium has been detected for the first time, the sensitivity is just enough to detect a touch input with the medium. Therefore, depending on the environment using the handheld terminal 10, the user may feel difficulty or response. Operation stability can be improved in the present embodiment because the recommended sensitivity mode is the sensitivity mode whose sensitivity is the second lowest among the sensitivity mode(s) in which a touch input is detected.

Fourth Embodiment

Figure 12:
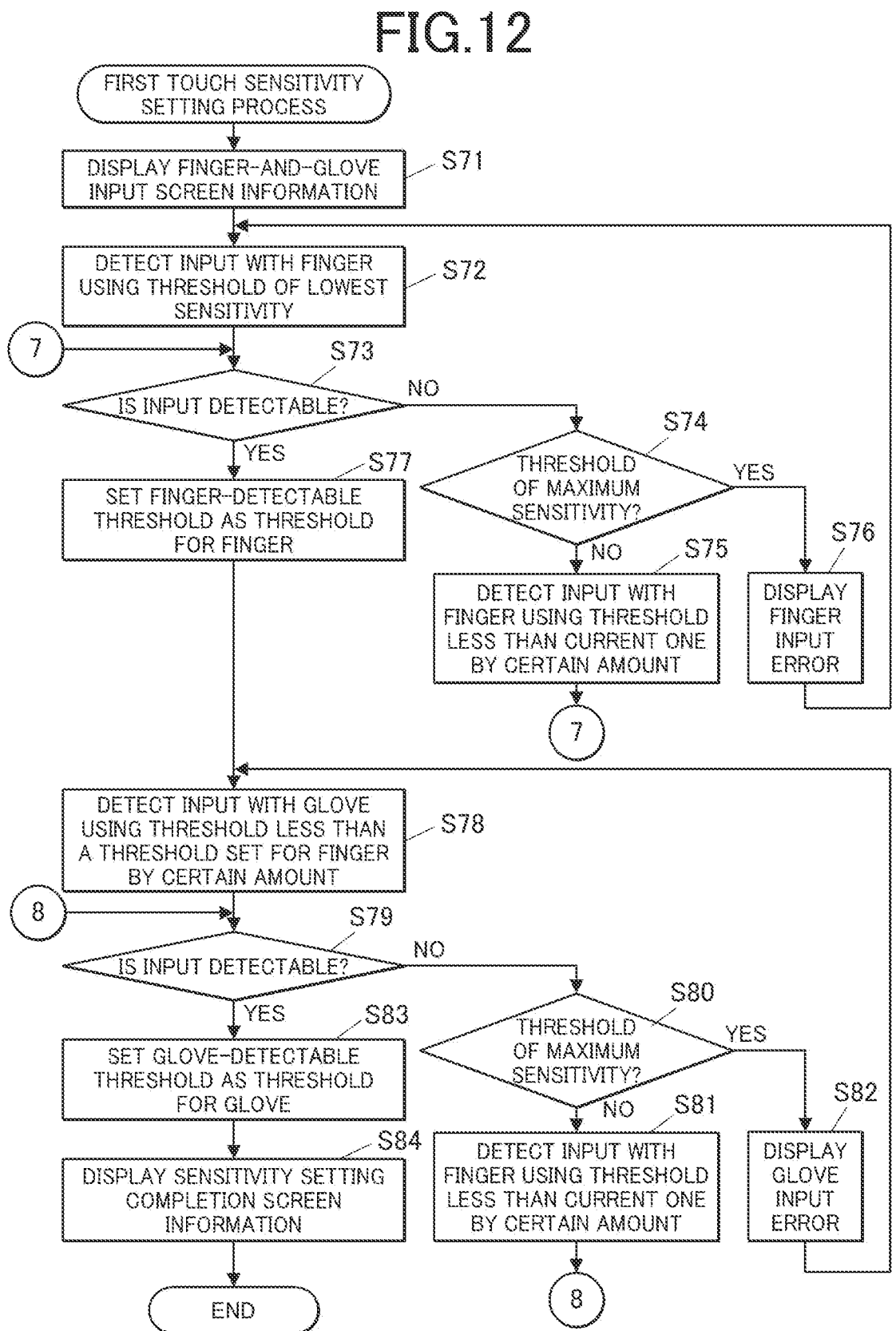
FIG. 12 is a flowchart illustrating a first touch sensitivity setting process.
Figure 13:
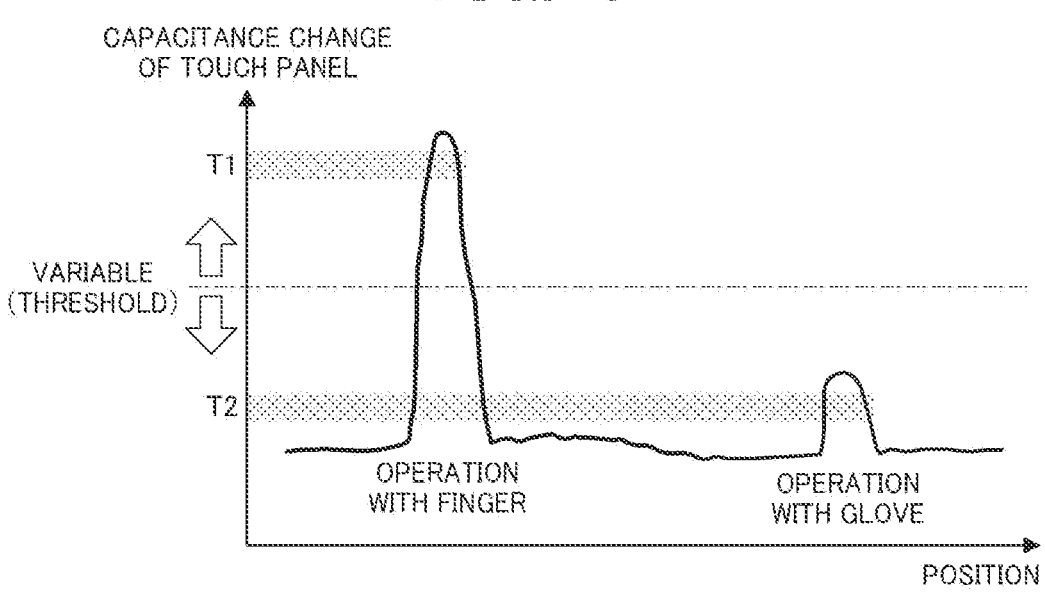
FIG. 13 illustrates capacitance change of a touch panel in response to touch inputs with a finger and with a glove with respect to a position in a fourth embodiment.

With reference to FIG. 12 and FIG. 13, the fourth embodiment of the present disclosure will be described. FIG. 12 is a flowchart illustrating the first touch sensitivity setting process. FIG. 13 illustrates the capacitance change of the touch panel 12B with respect to the position in response to touch inputs with a finger and with a glove in the present embodiment.

In the second embodiment, the recommended sensitivity mode is set out of the multiple sensitivity modes prepared in advance, and the recommended sensitivity mode for each medium is recommended. In the present embodiment, no sensitivity mode is prepared in advance. In the present embodiment, a touch input with each medium is received while the threshold of capacitance change is varied, and the threshold of capacitance change when the touch input is detected is set as the threshold for the medium.

As the device configuration in the present embodiment, the handheld terminal 10 is used in the same manner as the first embodiment. However, instead of the first touch sensitivity proposing program P1, the first touch sensitivity setting program for executing the first touch sensitivity setting process described below is stored in the storage 15.

Next, the operation of the handheld terminal 10 in the present embodiment will be described with reference to FIG. 12 and FIG. 13. In the present embodiment, no sensitivity mode is prepared in advance. However, for setting of the sensitivity of the touch input, the threshold corresponding to the lowest sensitivity (the largest capacitance change) and the threshold corresponding to the highest sensitivity (the least capacitance change) are set in advance.

The first touch sensitivity setting process is executed in the handheld terminal 10. In the first touch sensitivity setting process, the handheld terminal 10 receives touch inputs with the user's finger and with the glove simultaneously and sets the threshold of capacitance change for each medium based on the capacitance change in response to the touch input with each medium.

For example, triggered by the instruction to execute the first touch sensitivity setting process that is input by the user through the operation receiver 12, the CPU 11 performs the first touch sensitivity setting process according to the first touch sensitivity setting program stored in the storage 15.

As illustrated in FIG. 12, Step S71 is similar to Step S31 in the second touch sensitivity proposing process illustrated in FIG. 6. Then, the CPU 11 receives a touch input with a finger on the touch panel 12B at the position based on the position information of the input area 21D1, detects the capacitance change in response to the touch input, and detects the touch input with the finger by using the detected capacitance change and the threshold of capacitance change corresponding to the lowest sensitivity (Step S72). Step S73 is similar to Step S33 illustrated in FIG. 6.

If the touch input with the finger is not detectable (Step S73; NO), the CPU 11 judges whether or not the current threshold of capacitance change is the threshold corresponding to the highest sensitivity (Step S74). If the current threshold of capacitance change is not the threshold corresponding to the highest sensitivity (Step S74: NO), the CPU 11 receives a touch input with the finger on the touch panel 12B at the position based on the position information of the input area 21D1, detects the capacitance change in response to the touch input, detects the touch input with the finger by using the detected capacitance change and the threshold of capacitance change that is lower by a certain amount set in advance than the current threshold of capacitance change (Step S75), and moves the process to Step S73. Step S76 is similar to Step S36 illustrated in FIG. 6.

If a touch input with the finger is detectable (Step S73; YES), the CPU 11 sets the threshold of capacitance change that is used when the touch input with the finger is detected in Step S73 as the threshold of capacitance change for the finger (Step S77). The threshold of capacitance change for the finger that is set in Step S77 is, for example, stored in the storage 15. That is, through the processes from Step S72 to Step S77, of the multiple sensitivity levels (multiple thresholds), the detected sensitivity (detected threshold) with which the touch input with the finger is detectable is set as the threshold of capacitance change for the finger.

Then, the CPU 11 receives a touch input with a glove on the touch panel 12B at the position based on the position information of the input area 21D2, detects the capacitance change in response to the touch input, and detects the touch input with the glove by using the detected capacitance change and the threshold of capacitance change that is lower by a certain amount than the threshold of capacitance change set in Step S77 (Step S78). Step S79 is similar to Step S39 illustrated in FIG. 6.

If the touch input with the glove is not detectable (Step S79; NO), the CPU 11 judges whether or not the current threshold of capacitance change is the threshold corresponding to the highest sensitivity (Step S80). If the current threshold of capacitance change is not the threshold corresponding to the highest sensitivity (Step S80: NO), the CPU 11 receives a touch input with a glove on the touch panel 12B at the position based on the position information of the input area 21D2, detects the capacitance change in response to the touch input, and detects the touch input with the glove by using the detected capacitance change and the threshold of capacitance change that is lower by a certain amount set in advance than the current threshold of capacitance change (Step S81), and moves the process to Step S79. Step S82 is similar to Step S42 illustrated in FIG. 6.

If a touch input with the glove is detectable (Step S79; YES), the CPU 11 sets the threshold of capacitance change that is used when the touch input with the glove is detected in Step S79 as the threshold of capacitance change for the glove (Step S83). The threshold of capacitance change for the glove that is set in Step S83 is, for example, stored in the storage 15. That is, through the processes from Step S78 to Step S83, of the multiple sensitivity levels (multiple thresholds), the sensitivity (detected threshold) with which the touch input with the glove is detectable is set as the threshold of capacitance change for the glove.

Then, the CPU 11 causes the display 14 to display sensitivity setting screen information including a message about the completion of setting the threshold of capacitance change for the finger set in Step S77 and the threshold of capacitance change for the glove set in Step S83 (Step S84) and finishes the first touch sensitivity setting process.

After finish of the first touch sensitivity setting process, when the handheld terminal 10 has received input of a medium (a finger or a glove) to operate the touch panel 12B selected by the user through the operation receiver 12, for example, the CPU 11 reads the threshold of capacitance change stored in the storage 15 corresponding to the selected medium. Then, the CPU 11 sets the threshold of capacitance change of the touch panel 12B as the threshold of capacitance change for the medium read by the CPU 11.

Referring to FIG. 13, an example of setting thresholds of capacitance change in response to a touch input with a finger and a touch input with a glove will be described. FIG. 13 illustrates the capacitance change detected by the touch panel 12B in response to the touch inputs with the finger and with the glove with respect to the position in the +x direction on the display panel of the display 14 with a solid line.

In this example, in the first touch sensitivity setting process, the CPU repeats the processes including Step S72 in which the threshold corresponding to the lowest sensitivity is used, Step S73 in which the touch input with the finger is not detected, and Step S75 in which the threshold that is lower than the current threshold by a certain amount set in advance. Then, when the threshold T1 is used in Step S75 and the touch input with the finger is detected in the subsequent Step S73, the threshold of capacitance change in response to the touch input with the finger is set as the threshold T1 in Step S77.

In Step S78, the threshold of capacitance change that is lower by a certain amount than the already set threshold T1 of the capacitance change in response to the touch input with the finger is used. Then, the CPU 11 repeats the processes including Step S79 in which the touch input with the glove is not detected and Step S81 in which the threshold that is lower than the current threshold by a certain amount is used. Then, when the threshold T2 is used in Step S81 and the touch input with the glove is detected in the subsequent Step S79, the threshold of capacitance change in response to the touch input with the glove is set as the threshold T2 in Step S83. In Step S84, a sensitivity setting completion screen is displayed. The sensitivity setting completion screen includes a message about the completion of setting the threshold of capacitance change for the finger and the threshold of capacitance change for the glove.

According to the above embodiment, the CPU 11 sets the determined threshold of capacitance change for each medium as the threshold of capacitance change of the touch panel 12B. Therefore, the user only needs to select and input the medium to appropriately perform a touch input with each medium at the appropriate sensitivity (threshold of capacitance change).

Fifth Embodiment

Figure 14:
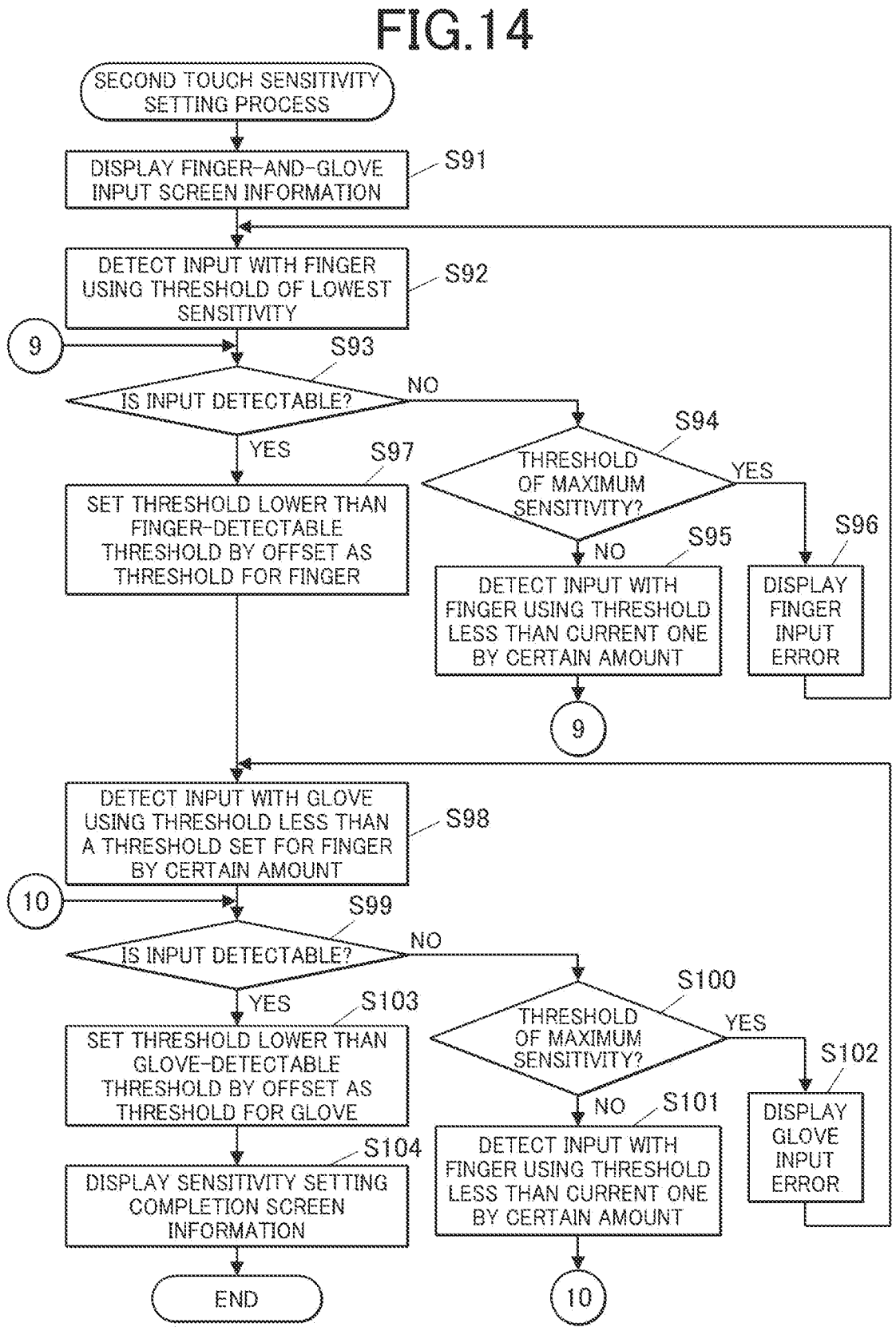
FIG. 14 is a flowchart illustrating a second touch sensitivity setting process.
Figure 15:
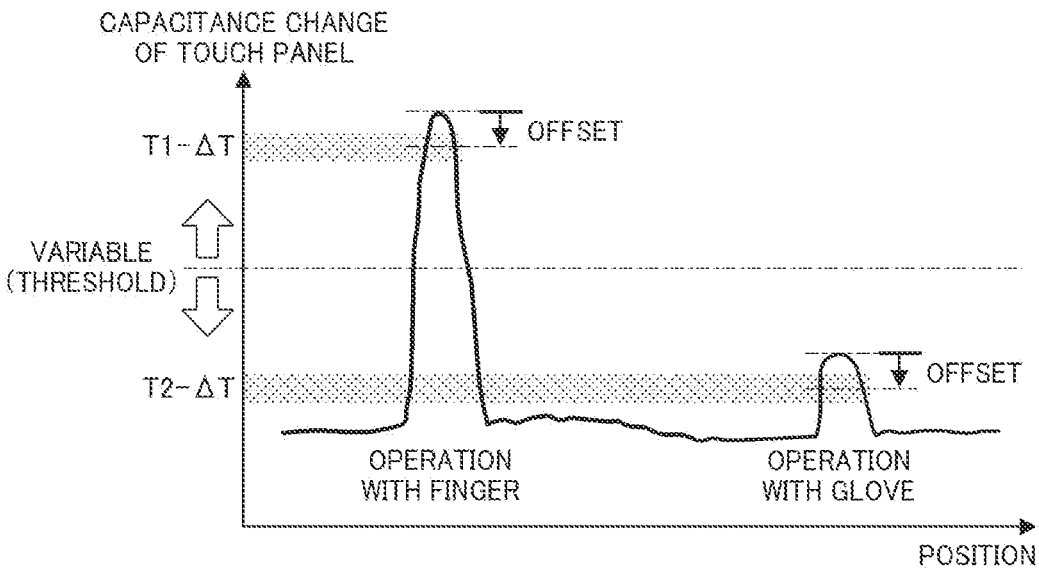
FIG. 15 illustrates capacitance change of a touch panel in response to touch inputs with a finger and with a glove with respect to a position in a fourth embodiment.

With reference to FIG. 14 and FIG. 15, the fifth embodiment of the present disclosure will be described. FIG. 14 is a flowchart illustrating the second touch sensitivity setting process. FIG. 15 illustrates the capacitance change of the touch panel 12B with respect to the position in response to touch inputs with a finger and with a glove in the present embodiment.

In the fourth embodiment, the touch input is received for each medium while the threshold of capacitance change is varied, and the threshold of capacitance change when the touch input is detected is set as the threshold for the medium. In the present embodiment, for each medium, the threshold of capacitance change that is lower by an offset than the threshold of capacitance change when the touch input is detected is set as the threshold for the medium.

As the device configuration in the present embodiment, the handheld terminal 10 is used in the same manner as the first embodiment. However, instead of the first touch sensitivity proposing program P1, the second touch sensitivity setting program for executing the second touch sensitivity setting process described below is stored in the storage 15.

Next, the operation of the handheld terminal 10 in the present embodiment will be described with reference to FIG. 14 and FIG. 15. In the present embodiment, in the same manner as the fourth embodiment, in order to set sensitivity of the touch input, the threshold of capacitance change corresponding to the lowest sensitivity and the threshold of capacitance change corresponding to the highest sensitivity are set in advance.

The second touch sensitivity setting process is executed in the handheld terminal 10. In the second touch sensitivity setting process, the handheld terminal 10 receives touch inputs by the user with the finger and with the glove simultaneously and sets the threshold of capacitance change for each medium, which is lower by an offset than the threshold of capacitance change when the touch input with each medium is detected, based on the capacitance change in response to the touch input with each medium.

For example, triggered by the instruction to execute the second touch sensitivity setting process that is input by the user through the operation receiver 12, the CPU 11 performs the second touch sensitivity setting process according to the second touch sensitivity setting program stored in the storage 15.

Step S91 to Step S96 illustrated in FIG. 14 are similar to Step S71 to Step S76 in the first touch sensitivity setting process illustrated in FIG. 12, respectively. If a touch input with the finger is detectable (Step S93; YES), the CPU 11 sets the threshold of capacitance change lower by an offset set in advance than the threshold of capacitance change used when the touch input with the finger is detected in Step S93 as the threshold of capacitance change for the finger (Step S97). The threshold of capacitance change for the finger set in Step S97 is stored in the storage 15, for example. That is, through the processes from Step S92 to Step S97, of the multiple sensitivity levels (multiple thresholds), the detected sensitivity (the threshold lower than the detected threshold by the offset) with which the touch input with the finger is detectable and that is higher than the detected sensitivity by the offset of the threshold is set as the threshold of capacitance change for the finger.

Step S98 to Step S12 are similar to Step S78 to Step S82 illustrated in FIG. 12, respectively. If a touch input with the glove is detectable (Step S99; YES), the CPU 11 sets the threshold of capacitance change lower by an offset than the threshold of capacitance change used when the touch input with the glove is detected in Step S99 as the threshold of capacitance change for the glove (Step S103). The threshold of capacitance change for the glove set in Step S103 is stored in the storage 15, for example. That is, through the processes from Step S98 to Step S103, of the multiple sensitivity levels (multiple thresholds), the detected sensitivity (threshold lower than the detected threshold by the offset) with which the touch input with the glove is detectable and that is higher than the detected sensitivity by the offset of the threshold is set as the threshold of capacitance change for the glove.

Then, the CPU 11 causes the display 14 to display a sensitivity setting screen information including a message about the completion of setting the threshold of capacitance change for the finger set in Step S97 and the threshold of capacitance change for the glove set in Step S103 (Step S104) and finishes the second touch sensitivity setting process.

The processes after the execution of the second touch sensitivity setting process is similar to those in the fourth embodiment. When the handheld terminal 10 has received input of the medium (a finger or a glove) to operate the touch panel 12B selected by the user through the operation receiver 12, the CPU 11 sets the threshold of capacitance change for the medium read from the storage 15 as the threshold of capacitance change of the touch panel 12B.

Referring to FIG. 15, an example of setting the threshold of capacitance change in response to a touch input with a finger and a touch input with a glove will be described. FIG. 15 illustrates the capacitance change detected by the touch panel 12B in response to the touch inputs with the finger and with the glove with respect to the position in the +x direction on the display panel of the display 14 with a solid line.

In this example, in the second touch sensitivity setting process, the CPU repeats the processes including Step S92 in which the threshold corresponding to the lowest sensitivity is used, Step S93 in which the touch input with the finger is not detected, and Step S95 in which the threshold that is lower than the current threshold by a certain amount is used. Then, when the threshold T1 is used in Step S95 and the touch input with the finger is detected in the subsequent Step S93, the threshold of capacitance change in response to touch input with the finger is set as the threshold $T1-\Delta T$ (offset) in Step S97.

The threshold of capacitance change that is lower by a certain amount than the already set threshold T1 of the capacitance change in response to a touch input with the finger is used in Step S98. Then, the CPU 11 repeats the processes including Step S99 in which the touch input with the glove is not detected and Step S101 in which the threshold that is lower than the current threshold by a certain amount is used. Then, when the threshold T2 is used in Step S101, and the touch input with the glove is detected in the subsequent Step S99, the threshold of capacitance change in response to a touch input with the glove is set as the threshold $T2-\Delta T$ in Step S103. In Step S104, a sensitivity setting completion screen is displayed. The sensitivity setting completion includes a message about the completion of setting the threshold of capacitance change for the finger and the threshold of capacitance change for the glove.

According to the above present embodiment, the CPU 11 determines the threshold of capacitance change that is lower by the predetermined offset than the threshold of capacitance change in response to a touch input by each medium to the threshold of capacitance change of the touch panel 12B. Operation stability can be improved in the present embodiment because the threshold of capacitance change of the touch panel 12B is the threshold of capacitance change that is lower by the offset than the threshold of capacitance change with which a touch input is detected.

The computer readable storage medium storing the program(s) for the present disclosure is not limited to the storage 15 such as a flash memory described above as an example. The computer readable storage medium may be another nonvolatile memory or a portable storage medium, such as a CD ROM. Further, as a medium that provide data of the program(s) of the present disclosure via a communication line, a carrier wave may be used in the present disclosure.

The above embodiments are described as examples of the information input device, sensitivity determination method, and storage medium, and do not limit the present invention. For example, at least two of the first to fifth embodiments may be combined as appropriate.

Figure 16:
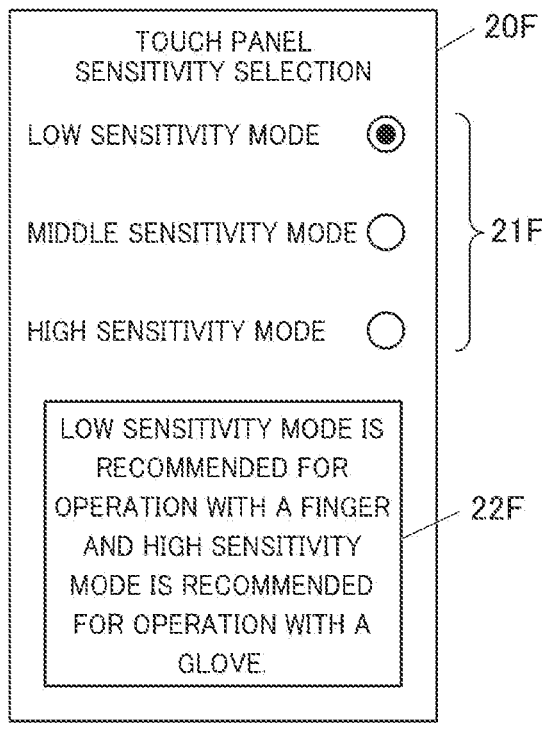
FIG. 16 is a diagram illustrating a touch panel sensitivity selection screen.

In the first and second embodiments, the recommended sensitivity mode proposing screen is displayed on the display 14 at the end of each of the first and second touch sensitivity proposing processes, but the present disclosure is not limited thereto. For example, as illustrated in FIG. 16, a touch panel sensitivity selection screen 20F may be displayed on the display 14. FIG. 16 is a diagram illustrating the touch panel sensitivity selection screen 20F.

First, the first and second touch sensitivity proposing processes are assumed to have been completed. For example, by the first and second touch sensitivity proposing processes, the low-sensitivity mode is set as the recommended sensitivity mode for the finger, and the high-sensitivity mode is set as the recommended sensitivity mode for the glove.

Then, triggered by the instruction to display the touch panel sensitivity selection screen that is input by the user through the operation receiver 12, the CPU 11 displays the touch panel sensitivity selection screen 20F. The touch panel sensitivity selection screen 20F includes a sensitivity mode selector 21F and a message 22F.

The sensitivity mode selector 21F receives input for selecting the sensitivity mode of the medium to be used thereafter, and includes, for example, selectable sensitivity modes and radio buttons. The message 22F recommends the recommended sensitivity mode for each medium that has been set in the first or second touch sensitivity proposing process. The message 22F, for example, recommends the low-sensitivity mode as the recommended sensitivity mode for the finger and recommends the high-sensitivity mode as the recommended sensitivity mode for the glove.

The CPU 11 sets the sensitivity mode selected and input through the sensitivity mode selector 21F as the sensitivity mode of the touch panel 12B. Similarly, in the modification of the second embodiment and the third embodiment, after the second or third touch sensitivity proposing process is completed, the touch panel sensitivity selection screen may also display a message recommending the recommended sensitivity mode for each medium.

In each of the above embodiments, a touch input with a finger is received so that the threshold of capacitance change (sensitivity mode) is determined, and a touch input with a glove is next received using a threshold that is lower than the threshold of capacitance change having determined for the finger so that the threshold of capacitance change (sensitivity mode) is determined, but the present disclosure is not limited thereto. The threshold of capacitance change used in detection of the touch input may be gradually increased from the lowest one (highest sensitivity mode).

For example, a touch input with a glove may be received and detected while the threshold of capacitance change is increased from the threshold corresponding to the lowest sensitivity (the sensitivity mode is decreased from the highest level), and the threshold of capacitance change (the sensitivity mode) selected before the one with which a touch input is no longer detected is determined as the threshold of capacitance change for the glove. Then, a touch input with a finger may be received using a threshold that is higher than the threshold of capacitance change having determined for the glove. A touch input with the finger is detected while the threshold of capacitance change is gradually increased, and the threshold of capacitance change (sensitivity mode) selected before the one with which a touch input is no longer detected is determined as the threshold of capacitance change for the finger.

Alternatively, a touch input may be detected using all possible thresholds of the capacitance change for each of the finger and the glove.

In some cases, one handheld terminal 10 is used by multiple users. For example, each of multiple users is given a login ID. The CPU 11 of the handheld terminal 10 receives the login ID and password input by the user through the operation receiver 12 and authenticates the login. The CPU 11 may execute one of the first to third touch sensitivity proposing processes and the first and second touch sensitivity setting processes for each login ID, and store the determined threshold of capacitance change for each medium (recommended sensitivity mode) and setting values for each login ID.

The type of the media with which a touch input on the touch panel 12B is made is not limited to a finger and a glove. The media may be at least two of a bare finger, a glove, a stylus pen, and the like. Also, for example, gloves and other media may be further subdivided by material, and thresholds may be set for each of the subdivisions.

Although some embodiments of the present disclosure have been described above, the scope of the present disclosure is not limited to the above-described embodiments, but includes the scope of disclosure described in the claims and its equivalent range.

The invention claimed is:

1. An information input device comprising:
a touch panel; and
a processor configured to execute processes comprising:
receiving a first touch input to the touch panel, the first touch input being input with a first input medium,
a first detecting including detecting which of multiple thresholds is exceeded by a capacitance change of the touch panel caused in response to the first touch input to the touch panel received from the first input medium,
determining a first threshold of capacitance change for the first input medium based on a result of the first detecting,
receiving a second touch input to the touch panel, the second touch input being input with a second input medium different from the first input medium,
a second detecting including detecting which of the multiple thresholds is exceeded by a capacitance change of the touch panel caused in response to the second touch input to the touch panel received from the second input medium,
determining a second threshold of capacitance change for the second input medium based on a result of the second detecting,
in response to determining the first threshold of capacitance change and the second threshold of capacitance change, outputting information indicating the first threshold of capacitance change and the second threshold of capacitance change having been determined,
setting, for the first input medium, a threshold of capacitance change that is lower by a predetermined offset than the first threshold of capacitance change determined for the first input medium, and
setting, for the second input medium, a threshold of capacitance change that is lower by a predetermined offset than the second threshold of capacitance change determined for the second input medium.

2. The information input device according to claim 1, wherein:
the processor is configured to cause a display to sequentially display multiple input screens each of which is configured to receive a respective one of the first touch input and the second touch input to the touch panel,
the receiving the first touch input comprises receiving the first touch input to the touch panel with the first input medium through a first input screen from among the multiple input screens, and
the receiving the second touch input comprises receiving the second touch input to the touch panel with the second input medium through a second input screen from among the multiple input screens, the second input screen being different from the first input screen.

3. The information input device according to claim 2, wherein:
the second threshold of capacitance change is lower than the first threshold of capacitance change,
the processor is configured to cause the display to display the first input screen before displaying the second input screen, and
a threshold used in the determining the second threshold of capacitance change is lower than a threshold used in the determining the first threshold of capacitance change.

4. The information input device according to claim 1, wherein:
the processor is configured to cause a display to display one input screen that is configured to receive both of the first touch input and the second touch input to the touch panel, and
the receiving the first touch input comprises receiving the first touch input to the touch panel with the first input medium through the one input screen, and
the receiving the second touch input comprises receiving the second touch input to the touch panel with the second input medium through the one input screen.

5. The information input device according to claim 4, wherein:
the second threshold of capacitance change is lower than the first threshold of capacitance change, and
a threshold used in the determining the second threshold of capacitance change is lower than a threshold used in the determining the first threshold of capacitance change.

6. The information input device according to claim 4, wherein:
the one input screen includes multiple input areas at different positions from each other, each of the input areas being configured to receive a respective one of the first touch input and the second touch input to the touch panel, and
the processor is configured to detect whether or not the first touch input and the second touch input have been made to the touch panel using position information of each of the input areas.

7. The information input device according to claim 1, wherein the processor is configured to:

determine a first sensitivity mode for the first input medium corresponding to the first threshold of capacitance change determined for the first input medium, and determine a second sensitivity mode for the second input medium corresponding to the second threshold of capacitance change determined for the second input medium.

8. The information input device according to claim 7, wherein the processor is configured to:

set, as the first sensitivity mode, a sensitivity mode corresponding to a threshold of capacitance change that is lower than and closest to the first threshold of capacitance change determined for the first input medium, and set, as the second sensitivity mode, a sensitivity mode corresponding to a threshold of capacitance change that is lower than and closest to the second threshold of capacitance change determined for the second input medium.

9. The information input device according to claim 1, wherein the processor is configured to cause a display to display displaying information that recommends the first and second thresholds of capacitance change determined for the first and second input media.

10. The information input device according to claim 1, wherein each of the first and second thresholds of capacitance change is a threshold of capacitance change of the touch panel.

11. A sensitivity determination method comprising:

receiving a first touch input to a touch panel, the first touch input being input with a first input medium;

a first detecting including detecting which of multiple thresholds is exceeded by a capacitance change of the touch panel caused in response to the first touch input to the touch panel received from the first input medium;

determining a first threshold of capacitance change for the first input medium based on a result of the first detecting;

receiving a second touch input to the touch panel, the second touch input being input with a second input medium different from the first input medium;

a second detecting including detecting which of the multiple thresholds is exceeded by a capacitance change of the touch panel caused in response to the second touch input to the touch panel received from the second input medium;

determining a second threshold of capacitance change for the second input medium based on a result of the second detecting;

in response to determining the first threshold of capacitance change and the second threshold of capacitance change, outputting information indicating the first threshold of capacitance change and the second threshold of capacitance change having been determined;

setting, for the first input medium, a threshold of capacitance change that is lower by a predetermined offset than the first threshold of capacitance change determined for the first input medium; and setting, for the second input medium, a threshold of capacitance change that is lower by a predetermined offset than the second threshold of capacitance change determined for the second input medium.

12. A non-transitory computer-readable storage medium storing a program that causes a computer of an information input device including a touch panel and a processor to execute processes comprising:

receiving a first touch input to a touch panel, the first touch input being input with a first input medium;

a first detecting including detecting which of multiple thresholds is exceeded by a capacitance change of the touch panel caused in response to the first touch input to the touch panel received from the first input medium;

determining a first threshold of capacitance change for the first input medium based on a result of the first detecting;

receiving a second touch input to the touch panel, the second touch input being input with a second input medium different from the first input medium;

a second detecting including detecting which of the multiple thresholds is exceeded by a capacitance change of the touch panel caused in response to the second touch input to the touch panel received from the second input medium;

determining a second threshold of capacitance change for the second input medium based on a result of the second detecting;

in response to determining the first threshold of capacitance change and the second threshold of capacitance change, outputting information indicating the first threshold of capacitance change and the second threshold of capacitance change having been determined;

setting, for the first input medium, a threshold of capacitance change that is lower by a predetermined offset than the first threshold of capacitance change determined for the first input medium; and setting, for the second input medium, a threshold of capacitance change that is lower by a predetermined offset than the second threshold of capacitance change determined for the second input medium.

* * * * *